(12) United States Patent
Iwasa et al.

(10) Patent No.: US 11,230,004 B2
(45) Date of Patent: Jan. 25, 2022

(54) ROBOT SYSTEM AND ROBOT CONTROL METHOD

(71) Applicant: KABUSHIKI KAISHA YASKAWA DENKI, Kitakyushu (JP)

(72) Inventors: Toshihiro Iwasa, Fukuoka (JP); Ryoichi Nagai, Fukuoka (JP); Nathanael Mullennix, Fukuoka (JP); Shingo Ando, Fukuoka (JP)

(*) Notice: Subject to any disclaimer, the term of this patent is extended or adjusted under 35 U.S.C. 154(b) by 173 days.

(21) Appl. No.: 16/591,637

(22) Filed: Oct. 3, 2019

(65) Prior Publication Data

US 2020/0122325 A1 Apr. 23, 2020

(30) Foreign Application Priority Data

Oct. 17, 2018 (JP) ............................. JP2018-196016

(51) Int. Cl.
*B25J 9/00* (2006.01)
*B25J 9/16* (2006.01)
*B25J 13/08* (2006.01)

(52) U.S. Cl.
CPC ........... *B25J 9/1664* (2013.01); *B25J 9/0081* (2013.01); *B25J 13/085* (2013.01)

(58) Field of Classification Search
CPC ...... B25J 9/1664; B25J 9/0081; B25J 13/085; B25J 9/1633; G05B 2219/36489; G05B 19/423
USPC ..... 700/245, 257, 253, 250, 252; 318/568.1, 318/568.13
See application file for complete search history.

(56) References Cited

U.S. PATENT DOCUMENTS

| 4,130,873 | A | 12/1978 | Fioretta et al. |
| 6,019,606 | A | 2/2000 | Yamamoto et al. |
| 2006/0181236 | A1 | 8/2006 | Brogardh |
| 2007/0145027 | A1 | 6/2007 | Izawa et al. |
| 2008/0150891 | A1* | 6/2008 | Berkley ................. G06F 3/016 345/156 |
| 2015/0246443 | A1 | 9/2015 | Linnell |
| 2016/0207196 | A1 | 7/2016 | Ohnishi et al. |

(Continued)

FOREIGN PATENT DOCUMENTS

| CN | 107728619 | 2/2018 |
| JP | H7-036513 | 2/1995 |

(Continued)

OTHER PUBLICATIONS

Office Action issued in Japanese Patent Application No. P2018-196016, dated Jun. 16, 2020 (with English partial translation).

(Continued)

*Primary Examiner* — Dalena Tran
(74) *Attorney, Agent, or Firm* — SOEI Patent & Law Firm

(57) ABSTRACT

A robot system includes circuitry. The circuitry may be configured to acquire teaching position data including a plurality of teaching positions arranged in time series based on the demonstration data of the operator. The circuitry may be further configured to generate thinned position data obtained by removing at least one of the teaching positions from the teaching position data. The circuitry may be further configured to generate a position command based on the thinned position data. The circuitry may be further configured to operate the work robot based on the position command.

24 Claims, 12 Drawing Sheets

(56) References Cited

U.S. PATENT DOCUMENTS

2018/0222057 A1* 8/2018 Mizobe ................. B25J 9/1697
2018/0225113 A1* 8/2018 Hasegawa ............... B25J 9/161

FOREIGN PATENT DOCUMENTS

| JP | H10-138182 | 5/1998 |
| JP | H11-090870 | 4/1999 |
| JP | 2010-058202 | 3/2010 |
| JP | 2016-062477 | 4/2016 |
| WO | 2015041046 | 3/2015 |
| WO | 2017/036519 | 3/2017 |

OTHER PUBLICATIONS

Partial Search Report issued in European Patent Application No. 19197569.7, dated Mar. 19, 2020.
Pan Zengxi et al., Robotic Machining Programing to Process Control In: "Robot Manipulators New Achievements", Retrieved from the Internet: URL: https://www.intechopen.com/books/robot-manipulators-new-achievements/roboticmachining-from-programing-to-process-control, Apr. 1, 2010, p. 35-p. 58.
Office Action issued in European Patent Application No. 19197569.7 dated Jun. 2, 2021.
Extended Search Report in corresponding European Application No. 20213747.7, dated Jun. 7, 2021.

* cited by examiner

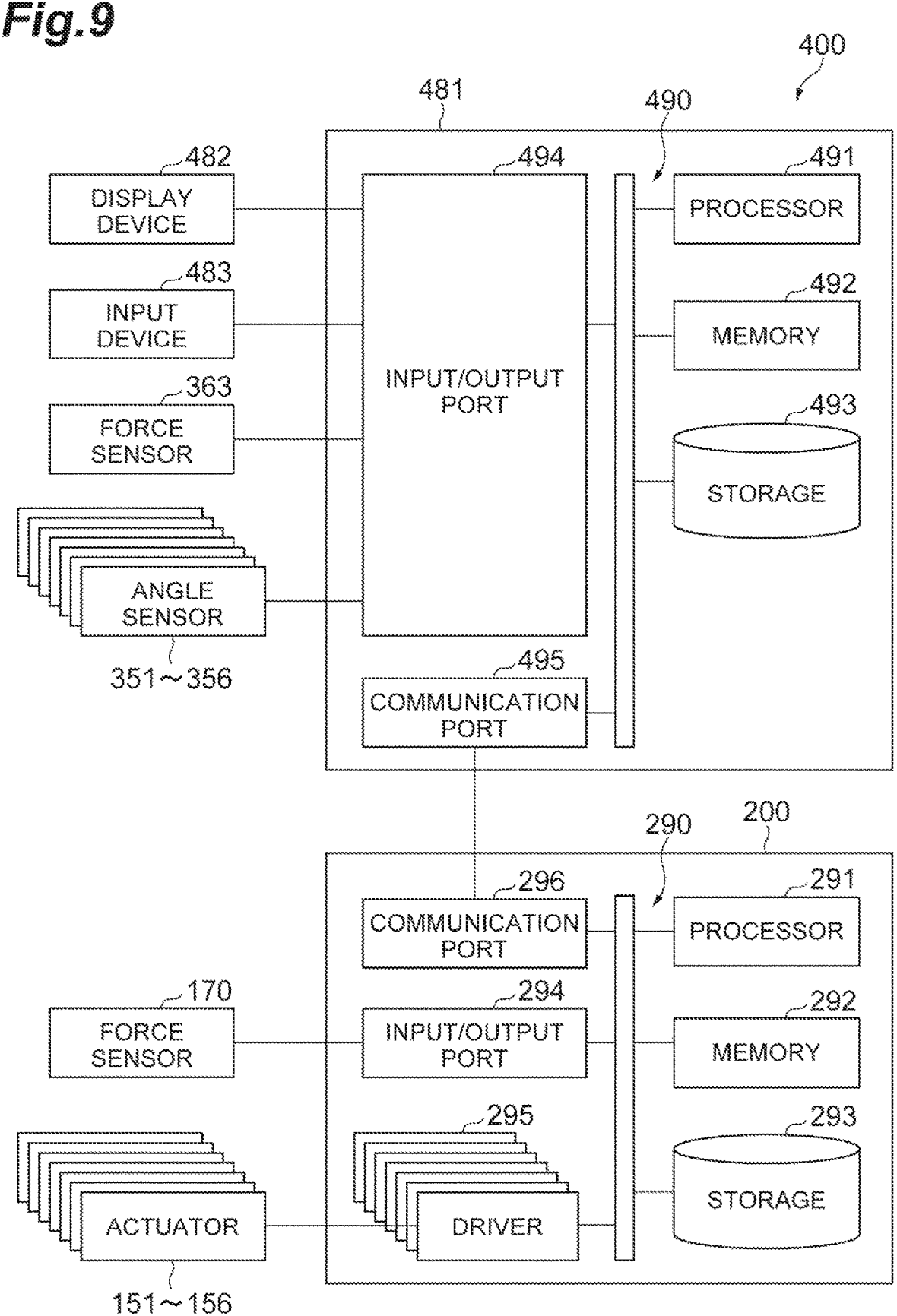

ROBOT SYSTEM AND ROBOT CONTROL METHOD

CROSS-REFERENCE TO RELATED APPLICATION

This application is based upon and claims the benefit of priority from Japanese Patent Application No. 2018-196016, filed on Oct. 17, 2018, the entire contents of which are incorporated herein by reference.

BACKGROUND

Field

The present disclosure relates to a robot system and a robot control method.

Description of the Related Art

Japanese Unexamined Patent Publication No. H10-138182 discloses a teaching device including a dummy tool, and a unit that detects the coordinate position and posture of the dummy tool in a three-dimensional space, in which the coordinate position and posture in a three-dimensional space of a dummy tool placed at a position to be taught is stored as teaching data.

SUMMARY

An example robot system disclosed herein may include circuitry. The circuitry may be configured to acquire teaching position data including a plurality of teaching positions arranged in time series based on demonstration data of an operator. The circuitry may be configured to generate thinned position data obtained by removing at least one of the teaching positions from the teaching position data. The circuitry may be configured to generate a position command based on the thinned position data. Additionally, the circuitry may be further configured to operate a work robot based the on position command.

An example robot control method may include acquiring teaching position data including a plurality of teaching positions arranged in time series based on demonstration data of an operator. The robot control method may further include generating thinned position data obtained by removing at least one of the teaching positions from the teaching position data. The robot control method may further include generating a position command based on the thinned position data. The robot control method may further include operating a work robot based on the position command.

BRIEF DESCRIPTION OF THE DRAWINGS

FIG. 9 is a block diagram illustrating an example hardware configuration of a teaching computer and a robot controller;

DETAILED DESCRIPTION

Figure 1:
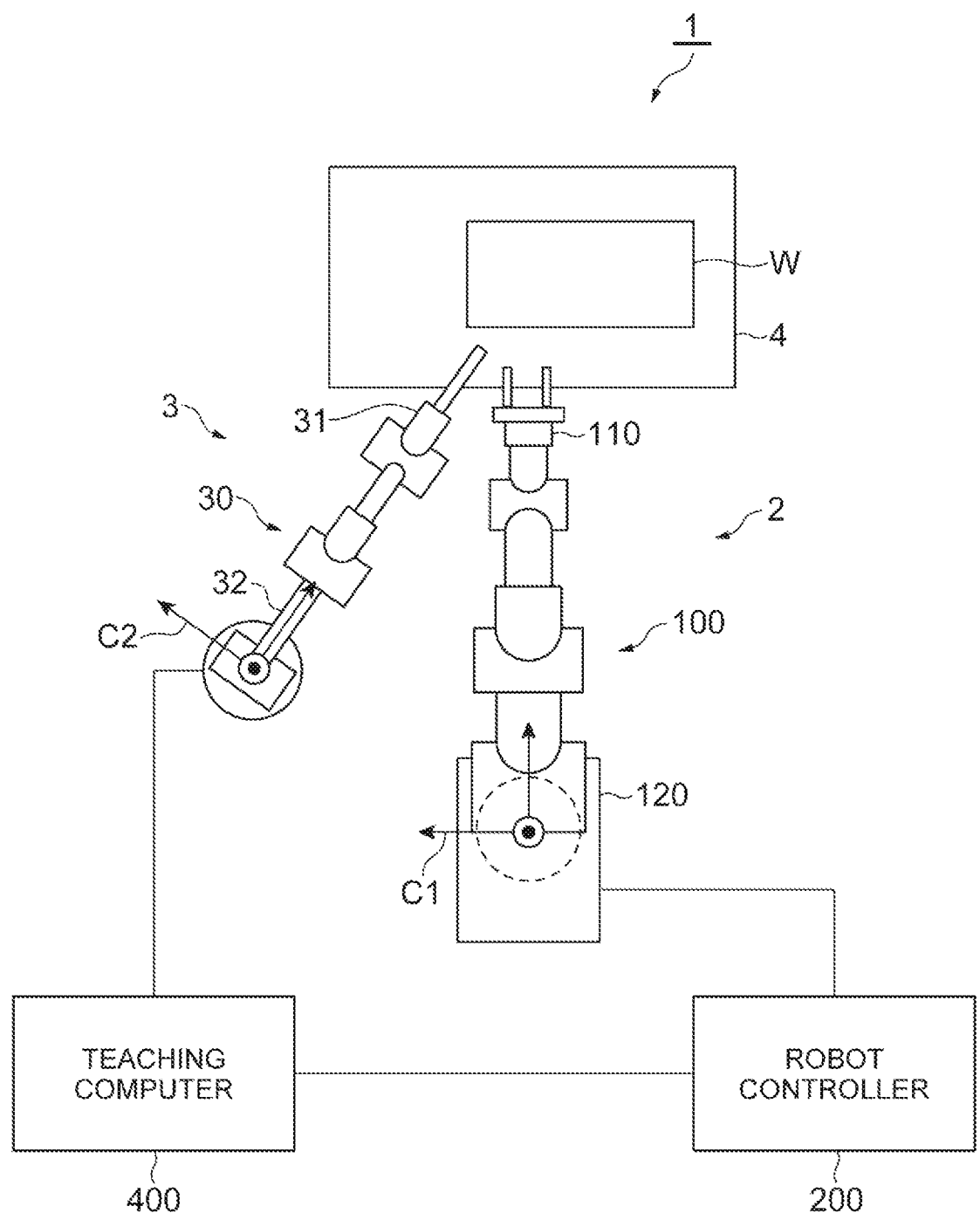
FIG. 1 is a schematic view illustrating an example configuration of a robot system.

Hereinafter, with reference to the drawings, the same element or similar elements having the same function are denoted by the same reference numerals, and redundant description is omitted.

Robot System

An example robot system 1 is a system for performing a polishing operation on a workpiece W. The operation performed by the robot system 1 is not limited to the polishing operation. The robot system 1 may cause the robot to perform other operations in which the robot is operated according to a previously taught motion. As illustrated in FIG. 1, the robot system 1 includes a robot apparatus 2 and a motion teaching apparatus 3.

Robot Apparatus

The robot apparatus 2 includes a work robot 100 and a robot controller 200. The robot 100 performs the polishing operation on the workpiece W by pressing the workpiece W against a polishing machine 4. The robot controller 200 controls the robot 100 so that the robot 100 performs the polishing operation on the workpiece W in accordance with the motion taught in advance.

Figure 2:
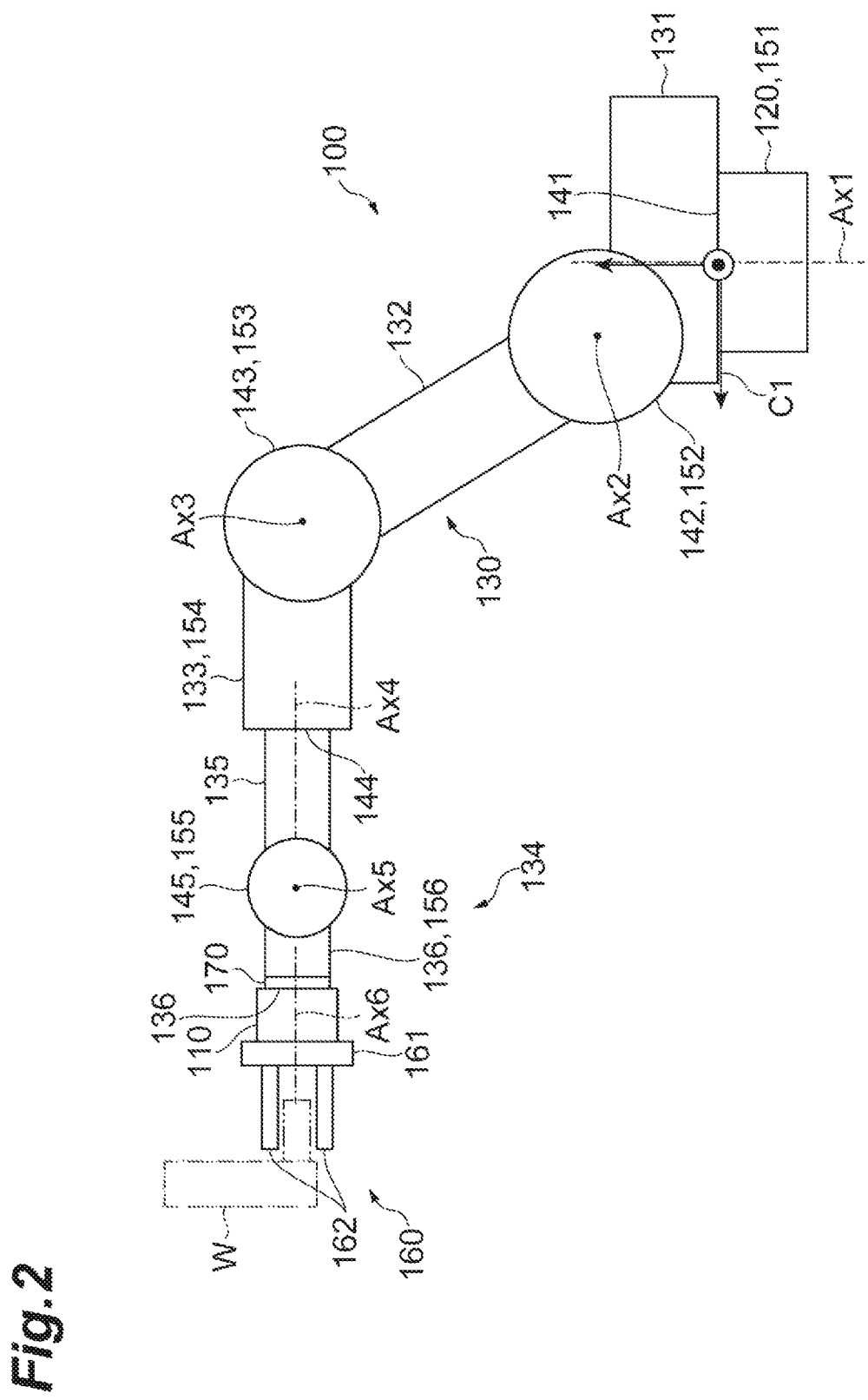
FIG. 2 is a schematic view illustrating an example configuration of a vertically articulated robot.

As illustrated in FIG. 2, the robot 100 is a six-axis vertically articulated robot, and includes a distal end 110, a base 120, and an articulated arm 130 that changes the position and posture of the distal end 110 with respect to the base 120. The base 120 is installed, for example, on a floor surface in the operation area of the robot 100. In addition, the base 120 may be installed in a movable part, such as a trolley. The articulated arm 130 connects the base 120 and the distal end 110, and changes the position and posture of the distal end 110 in a first coordinate system C1 (robot coordinate system). The robot coordinate system is a coordinate system serving as a reference of control of the robot 100, and is, for example, a coordinate system fixed to the base 120.

For example, the articulated arm 130 includes a pivoting portion 131, a first arm 132, a second arm 133, a wrist portion 134, and actuators 151, 152, 153, 154, 155, and 156. The pivoting portion 131 is provided on the upper portion of the base 120 so as to be pivotable around a vertical axis Ax1. In some examples, the articulated arm 130 has a joint 141 which enables the pivoting portion 131 to pivot around the axis Ax1.

The first arm 132 is connected to the pivoting portion 131 so as to be swingable around an axis Ax1 that intersects (for example, orthogonal to) the axis Ax1. In some examples, the articulated arm 130 has a joint 142 that enables the first arm 132 to swing around the axis Ax2. The term "intersect" as used herein also includes the case where they are in a twisted relationship with each other, as in a so-called multilevel intersection. The same applies to the following.

The second arm 133 is connected to the end of the first arm 132 so as to be swingable around an axis Ax3 intersecting the axis Ax1. In some examples, the articulated arm 130 has a joint 143 which enables the second arm 133 to swing around the axis Ax3. The axis Ax3 may be parallel to the axis Ax2.

The wrist portion 134 has a pivot arm 135 and a swing arm 136. The pivot arm 135 extends from the end of the second arm 133 along the center of the second arm 133, and is pivotable around an axis Ax4 along the center of the second arm 133. In some examples, the articulated arm 130 has a joint 144 that enables the pivot arm 135 to pivot around the axis Ax4.

The swing arm 136 is connected to the end of the pivot arm 135 so as to be swingable around an axis Ax5 that intersects (for example, orthogonal to) the axis Ax4. In some examples, the articulated arm 130 has a joint 145 that enables the swing arm 136 to swing around the axis Ax5.

The distal end 110 is connected to the end of the swing arm 136 so as to be pivotable around an axis Ax6 along the center of the swing arm 136. In some examples, the articulated arm 130 has a joint 146 that enables the distal end 110 to pivot around the axis Ax6.

The actuators 151, 152, 153, 154, 155, and 156 use, for example, an electric motor as a power source, and drive the plurality of joints 141, 142, 143, 144, 145, and 146 of the articulated arm 130, respectively. For example, the actuator 151 pivots the pivoting portion 131 around the axis Ax1, the actuator 152 swings the first arm 132 around the axis Ax1, the actuator 153 swings the second arm 133 around the axis Ax3, the actuator 154 pivots the pivot arm 135 around the axis Ax4 the actuator 155 swings the swing arm 136 around the axis Ax5, and the actuator 156 pivots the distal end 110 around the axis Ax6. In some examples, the actuators 151 to 156 drive the joints 141 to 146, respectively.

The distal end 110 is provided with a hand 160. The hand 160 is a tool for gripping a work object such as the workpiece W, and is provided at the distal end 110. The hand 160 includes a main body 161 and a plurality of finger portions 162. The plurality of finger portions 162 is disposed so as to surround (or sandwich) the arrangement area of the work object, and is connected to the main body 161. The main body 161 is attached to the distal end 110, and drives the plurality of finger portions 162 using, for example, an electric motor as a drive source. The main body 161 brings the plurality of finger portions 162 close to each other when gripping the work object, and brings the plurality of finger portions 162 away from each other when releasing the work object. The work object is not limited to the workpiece W. The work object by the hand 160 may be a tool for performing an operation on the workpiece W.

The hand 160 is attached to the distal end 110 via a force sensor 170. The force sensor 170 detects the force acting on the hand 160. For example, the force sensor 170 is a six-axis force sensor that detects six types of forces, which are forces along three mutually perpendicular axes and pieces of torque around the three axes.

The configuration of the robot 100 described above is merely an example. The robot 100 may have other configurations in which the position and posture of the base 120 with respect to the base 120 are changed by the articulated arm 130. For example, the robot 100 may be a seven-axis robot in which a redundant axis is added to the six-axis vertically articulated robot.

Motion Teaching Apparatus

Returning to FIG. 1, the motion teaching apparatus 3 includes a demonstration device 30 and a teaching computer 400. The demonstration device 30 includes a demonstration tool 31 and a teaching motion detection unit 32. The demonstration tool 31 is a tool for performing motion teaching on the robot 100 by demonstration. For example, the demonstration tool 31 is attached to the work object in the operation to be taught, and moves along with the work object to become a measurement target of the position and posture.

The teaching motion detection unit 32 detects the position and posture of the demonstration tool 31 in a second coordinate system C2 different from the first coordinate system C1. For example, the teaching motion detection unit 32 is connected to the demonstration tool 31, and includes a passive articulated arm 33 which moves according to the position and posture of the demonstration tool 31 and a sensor 34 that detects the posture of the articulated arm 33. The teaching motion detection unit 32 may have other configurations in which the position and posture of the demonstration tool 31 in the second coordinate system C2 are detected. For example, the teaching motion detection unit 32 may detect the position and posture of the demonstration tool 31 without contact based on image information or the like.

The teaching computer 400 acquires, from the demonstration device 30, data of the motion to be shown by the demonstration, and generates a motion command for the robot 100 based on the acquired data. Hereinafter, the configuration of the arm-type demonstration device 30 described above will be described in more detail as an example in the case of detecting the position and posture of the demonstration tool 31 by contact.

Figure 3:
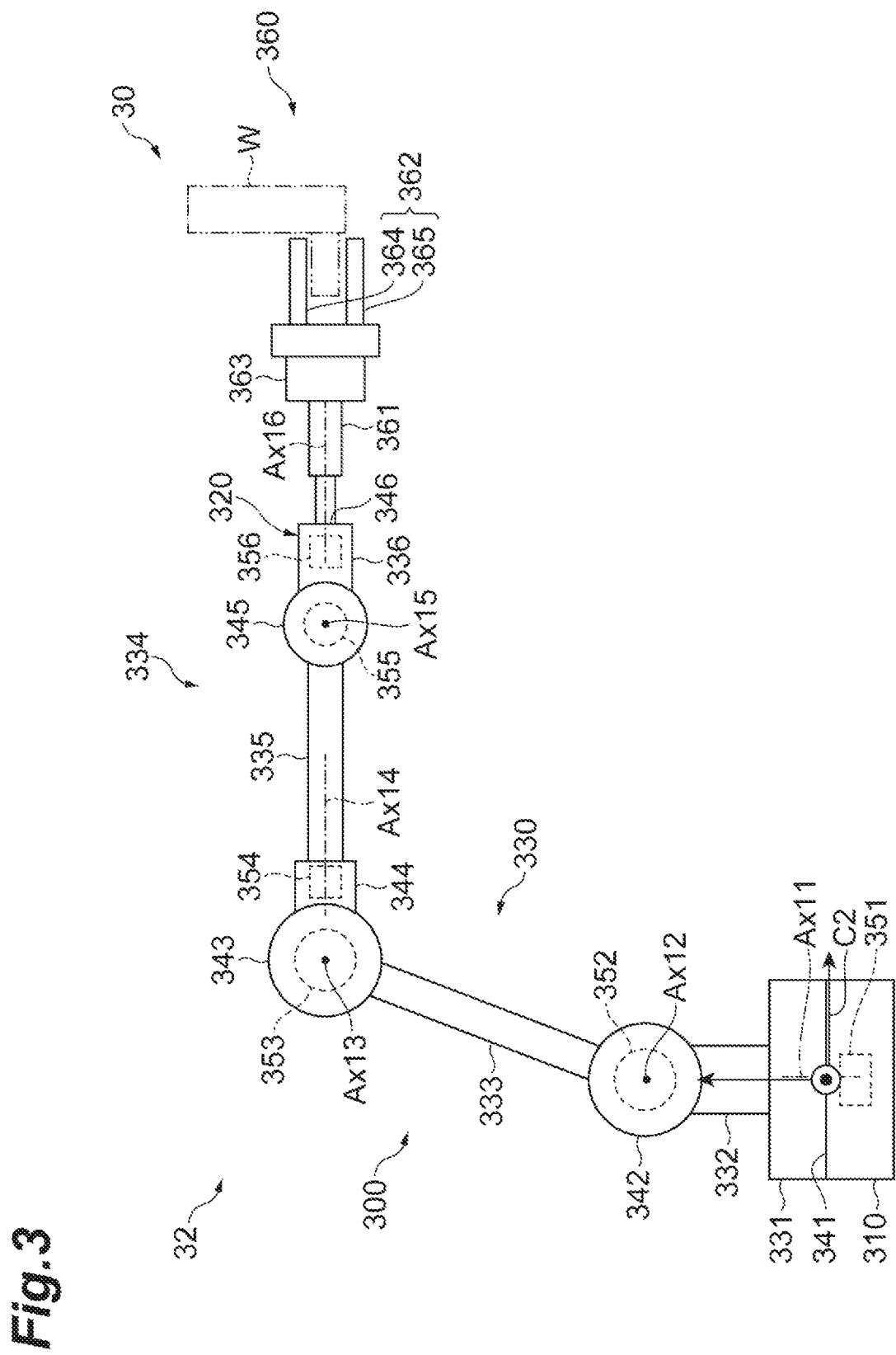
FIG. 3 is a schematic view illustrating an example configuration of a demonstration device.

As illustrated in FIG. 3, the demonstration device 30 includes a digitizer 300 and a demonstration operation tool 360. The digitizer 300 includes a base 310, a distal end 320 and an articulated arm 330. The base 310 is installed, for example, on a floor surface in the operation area of the robot 100. In addition, the base 310 may be installed in a movable part, such as a trolley.

The articulated arm 330 is an example of the articulated arm 33. The articulated arm 330 connects the base 310 and the distal end 320, and operates in accordance with the position and posture of the distal end 320 in the second coordinate system C2 (demonstration coordinate system). The demonstration coordinate system is a coordinate system preset as a detection reference of the position and posture of the demonstration tool 31, and is, for example, a coordinate system fixed to the base 310.

For example, the articulated arm 330 includes a pivoting portion 331, a first arm 332, a second arm 333, a wrist portion 334, and angle sensors 351, 352, 353, 354, 355, and 356.

The pivoting portion 331 is provided on the upper portion of the base 310 so as to be pivotable around a vertical axis Ax11. In some examples, the articulated arm 330 has a joint 341 that enables the pivoting portion 331 to pivot around the axis Ax11.

The first arm 332 is connected to the pivoting portion 331 so as to be swingable around the axis Ax12 that intersects (for example, orthogonal to) the axis Ax11. In some examples, the articulated arm 330 has a joint 342 that enables the first arm 332 to swing around the axis Ax12.

The second arm 333 is connected to the end of the first arm 332 so as to be swingable around an axis Ax13 intersecting the axis Ax11. In some examples, the articulated arm 330 has a joint 343 that enables the second arm 333 to swing around the axis Ax13. The axis Ax13 may be parallel to the axis Ax12.

The wrist portion 334 has a pivot arm 335 and a swing arm 336. The pivot arm 335 extends from the end of the second arm 333 along the center of the second arm 333, and is pivotable around an axis Ax14 along the center of the second arm 333. In some examples, the articulated atm 330 has a joint 344 that enables the pivot arm 335 to pivot around the axis Ax14.

The swing arm 336 is connected to the end of the pivot arm 335 so as to be swingable around an axis Ax15 that intersects (for example, orthogonal to) the axis Ax14. In some examples, the articulated arm 330 has a joint 345 that enables the swing arm 336 to swing around the axis Ax15.

The distal end 320 is connected to the end of the swing mill 336 so as to be pivotable around an axis Ax16 along the center of the swing arm 336. In some examples, the articulated arm 330 has a joint 346 that enables the distal end 320 to pivot around the axis Ax16.

The angle sensors 351, 352, 353, 354, 355, and 356 are an example of the sensor 34. The angle sensors 351, 352, 353, 354, 355, and 356 are, for example, angle sensors such as a rotary encoder or a potentiometer, and detects the motion angles of the plurality of joints 341, 342, 343, 344, 345, and 346 of the articulated arm 330, respectively. For example, the angle sensor 351 detects the pivoting angle of the pivoting portion 131 around the axis Ax11, the angle sensor 352 detects the swing angle of the first arm 332 around the axis Ax12, the angle sensor 353 detects the swing angle of the second arm 333 around the axis Ax13, the angle sensor 354 detects the pivoting angle of the pivot arm 335 about the axis Ax14, the angle sensor 355 detects the swing angle of the swing arm 336 around the axis Ax15, and the angle sensor 356 detects the pivoting angle of the distal end 320 about the axis Ax16.

The demonstration operation tool 360 can be detachably attachable to the distal end 320. In the present configuration, the demonstration tool 31 includes the distal end 320 and the demonstration operation tool 360.

The demonstration operation tool 360 is a tool for gripping a work object such as the workpiece W. For example, the demonstration operation tool 360 includes a mounting portion 361, a hand 362, and a force sensor 363. The mounting portion 361 is attached to and detached from the distal end 320. The hand 362 is a portion for gripping the work object. The hand 362 includes a main body 364 and a plurality of finger portions 365. The plurality of finger portions 365 is disposed so as to surround (or sandwich) the arrangement area of the work object, and is connected to the main body 364. The main body 364 moves the plurality of finger portions 365 by manual operation by the operator, for example. The main body 364 brings the plurality of finger portions 365 close to each other when gripping the work object, and brings the plurality of finger portions 365 away from each other when releasing the work object. The work object is not limited to the workpiece W. The work object by the demonstration operation tool 360 may be a tool for performing an operation on the workpiece W.

The hand 362 is attached to the mounting portion 361 via the force sensor 363. The force sensor 363 detects a force acting on the hand 362 as an example of a force acting on the demonstration tool 31. For example, the force sensor 363 is a six-axis force sensor that detects six types of forces, which are forces along three mutually perpendicular axes and pieces of torque around the three axes.

Teaching Computer

Subsequently, an example configuration of the teaching computer 400 will be described in further detail. The teaching computer 400 generates a motion command for the robot 100 based on demonstration data of the operator. The demonstration data of the operator is acquired during the demonstration operation by the operator, and includes at least data on the position and posture of the demonstration tool 31 during the demonstration operation. The motion command includes at least a position command. The position command is a command for causing the distal end 110 to sequentially follow a plurality of target positions arranged in time series, and includes a plurality of movement commands corresponding to the plurality of respective target positions. The target positions include a target value of the position of the distal end 110 and a target value of the posture of the distal end 110.

For example, the teaching computer 400 is configured to perform operations comprising acquiring teaching position data including a plurality of teaching positions arranged in time series based on the demonstration data of the operator, generating thinned position data obtained by removing at least one of the teaching positions from the teaching position data, and generating a position command based on thinned position data.

The demonstration data of the operator may further include data on the force acting on the demonstration tool 31 during the demonstration operation, and the motion command may include a force command. The force command is a command for causing the force applied by the robot 100 to the work object to sequentially follow a plurality of target work forces arranged in time series, and includes a plurality of force application commands corresponding to the plurality of respective target work forces. The force applied by the robot 100 to the work object may include a working force. The working force may be a force other than an inertia force and applied to the work object. The working force may include a force generated by bringing the work object and another object in contact with each other. The working force may be a force generated by pressing the workpiece W against a polishing machine 4. The teaching computer 400 may be configured to further perform operations comprising acquiring teaching force data including a plurality of teaching forces arranged in time series based on the demonstration data of the operator, generating thinned force data obtained by removing at least one of the teaching forces from the teaching force data, and generating a force command based on thinned force data.

For example, the teaching computer 400 includes, as a functional configuration (hereinafter referred to as "functional module"), a teaching position acquisition unit 411, a teaching force acquisition unit 412, a teaching data storage unit 413, a position thinning unit 414, a position command generation unit 415, a force thinning unit 416, a force command generation unit 417, a command storage unit 418, and a command registration unit 419. In some examples, the terms "unit" and/or "module" as used herein may be understood to include devices, apparatus or system components.

The teaching position acquisition unit 411 acquires teaching position data including a plurality of teaching positions arranged in time series based on the demonstration data of the operator. The teaching position may be other information for determining the target position of the distal end 110. For example, the teaching position may be information that directly determines the target position of the distal end 110 (for example, the target position of the distal end 110), or may be information that indirectly determines the target position of the distal end 110.

As an example of demonstration data of an operator, the teaching position acquisition unit 411 acquires information on the motion angles of the joints 341, 342, 343, 344, 345, and 346 of the articulated arm 330 from the angle sensors 351, 352, 353, 354, 355, and 356, respectively during the demonstration operation using the demonstration tool 31. Furthermore, the teaching position acquisition unit 411 calculates the position and posture of the demonstration tool 31 in the second coordinate system C2 by performing the forward kinematics calculation based on the motion angles of the joints 341, 342, 343, 344, 345, and 346 of the articulated arm 330. Based on the position and posture of the demonstration tool 31 in the second coordinate system C2, the target position of the distal end 110 is determined by performing a calculation including coordinate conversion from the second coordinate system C2 to the first coordinate system C1. Therefore, the position and posture of the demonstration tool 31 in the second coordinate system C2 correspond to an example of the teaching position.

The teaching position acquisition unit 411 acquires teaching position data including a plurality of teaching positions arranged in time series by periodically repeating, during the demonstration operation, the acquisition of information on the motion angles of the joints 341, 342, 343, 344, 345, and 346, and the calculation of the position and posture of the demonstration tool 31 in the second coordinate system C2.

The teaching force acquisition unit 412 acquires teaching force data including a plurality of teaching forces arranged in time series based on the demonstration data of the operator. The teaching force may include information for defining the target work force of the distal end 110 (the target value of the force applied to the work object by the distal end 110). For example, the teaching force may include information that directly determines the target work force of the distal end 110 (for example, the target work force itself of the distal end 110), or may include information that indirectly determines the target work force of the distal end 110. As an example of demonstration data of an operator, the teaching force acquisition unit 412 acquires information on the force acting on the demonstration tool 31 from the force sensor 363 during a demonstration operation using the demonstration tool 31. Based on the force acting on the demonstration tool 31, the force (for example, the target work force) to be applied to the work object by the distal end 110 is determined. Therefore, the force acting on the demonstration tool 31 corresponds to an example of the teaching force. The teaching force acquisition unit 412 acquires teaching force data including a plurality of teaching forces arranged in time series by periodically repeating, during the demonstration operation, the acquisition of information of the force acting on the demonstration tool 31, and the calculation of the target work force of the distal end 110.

The teaching data storage unit 413 stores the teaching position data acquired by the teaching position acquisition unit 411 and the teaching force data acquired by the teaching force acquisition unit 412.

The position thinning unit 414 generates thinned position data obtained by removing at least one of teaching positions from the teaching position data stored in the teaching data storage unit 413. In some examples, the position thinning unit 414 may generate the thinned position data based on an influence of at least one of the teaching positions on a movement of the robot 100. For example, the position thinning unit 414 removes the teaching position having a small influence on the movement of the robot 100 from the teaching position data to generate thinned position data. In some examples, the teaching position includes two teaching positions having different influence on the movement of the robot 100, and the position thinning unit 414 may remove, from the teaching position data, one of the two teaching position having a small influence on the movement of the robot.

As an example of the thinning process based on the influence on the movement of the robot 100, when the difference between the motion of the robot 100 when the teaching position is present and the motion of the robot 100 when the teaching position is not present is large, the position thinning unit 414 may generate thinned position data so that the teaching position remains. In other words, the influence of the teaching position may include a change in a motion of the robot 100 in accordance with the teaching position data by removing the teaching position from the teaching position data.

As an example of a numerical value which shows the difference between the motion of the robot 100 when the teaching position is present and the motion of the robot 100 when the teaching position concerned is not present, the position thinning unit 414 may calculate an amount of offset between a teaching position, and the reference line connecting teaching positions prior to and posterior to the teaching position, and based on the amount of offset, may determine whether to remove the teaching position. In other words, the position thinning unit may generate the thinned position data based on the amount of offset between the teaching position and the reference line. In some examples, the term "amount of offset" may be understood to include a difference, variation or measurement of: distance, force, angle, attitude, time, speed, acceleration, location, vectors, or any combination thereof. Additionally, the amount of offset may be determined with respect to the operating tip of the robot, the demonstration tool, the workpiece, or any combination thereof.

For example, after using the teaching positions at both ends in the time segment of at least part of the teaching position data (or adding the teaching positions of both ends in a time segment of at least part of the teaching position data to a selected group), the position thinning unit 414 repeats one or more operations including deriving a reference line connecting the used teaching positions (or the teaching positions added to the selected group), and determining whether to use another teaching position (or adding the other teaching position of the time segment to the selected group) based on the amount of offset from the reference line until a predetermined condition is satisfied. Additionally, the position thinning unit 414 removes the teaching position that has not been used (or added to the selected group) to generate the thinned position data. An example of the above-mentioned predetermined condition (hereinafter referred to as "repetition completion condition") may include that the number of used teaching positions reaches the upper limit value. In other words, the position thinning unit 414 may repeat operations including deriving the reference line and adding another teaching point to the selected group based on the amount of offset from the reference line to the other teaching position until the number of the teaching positions added to the selected group reaches a predetermined upper limit value. The upper limit value is set based on, for example, the number of movement commands that can be registered in the robot controller 200. One teaching position may include a plurality of numerical elements (for example, position and posture angle for each coordinate axis). In this case, the position thinning unit 414 may calculate the amount of offset between the teaching position and the reference line by adding up the amount of offset for each numerical element.

Figure 5:
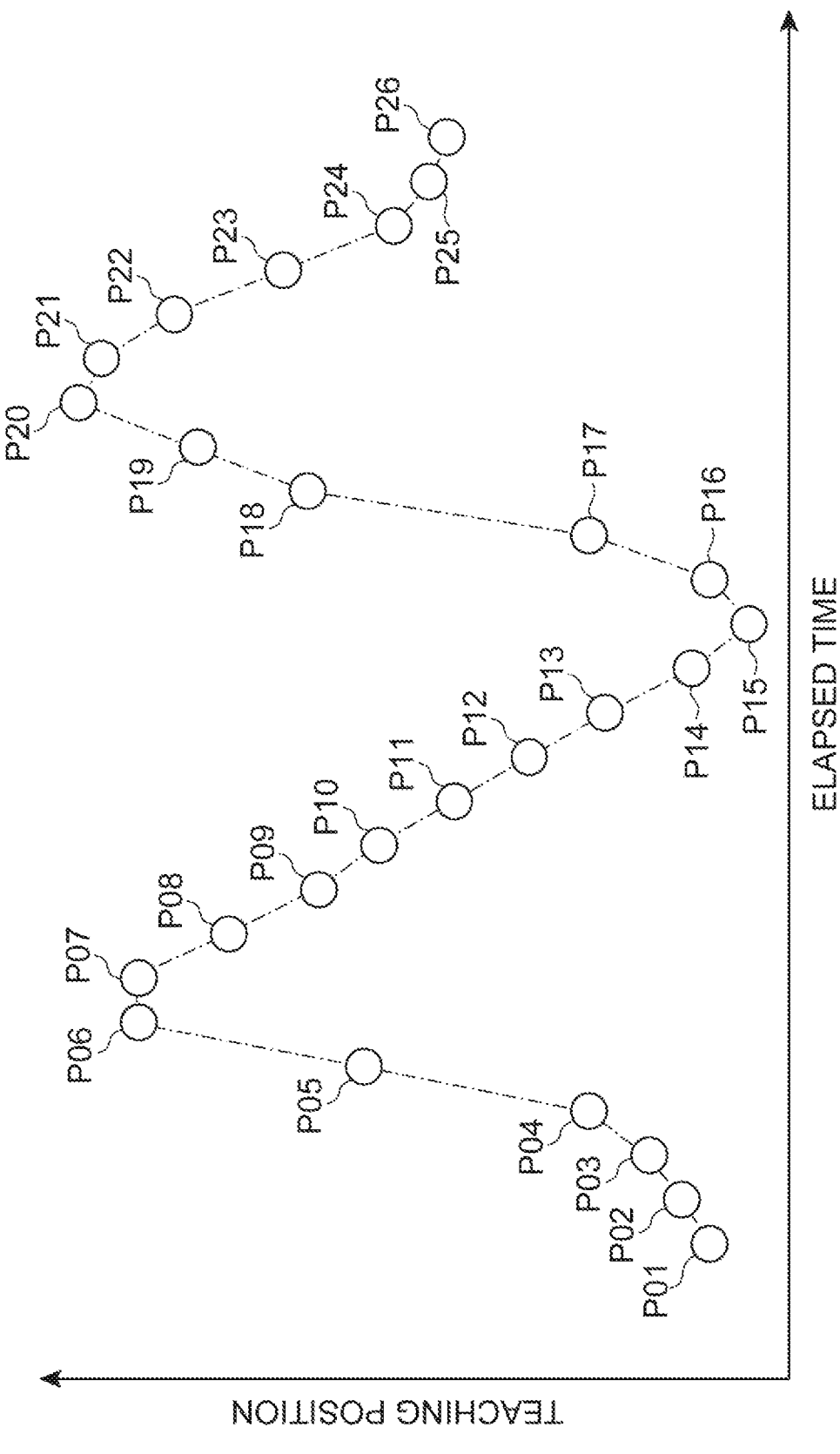
FIG. 5 is a graph illustrating an example teaching position data.
Figure 6D:
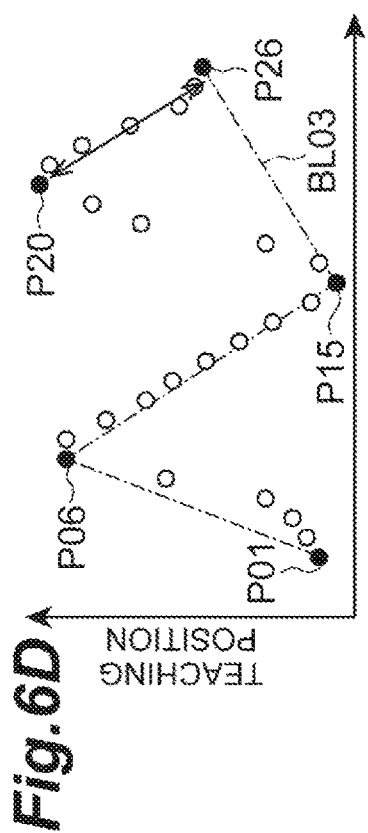
FIGS. 6A to 6F are graphs illustrating example particulars of a thinning process.
Figure 6E:
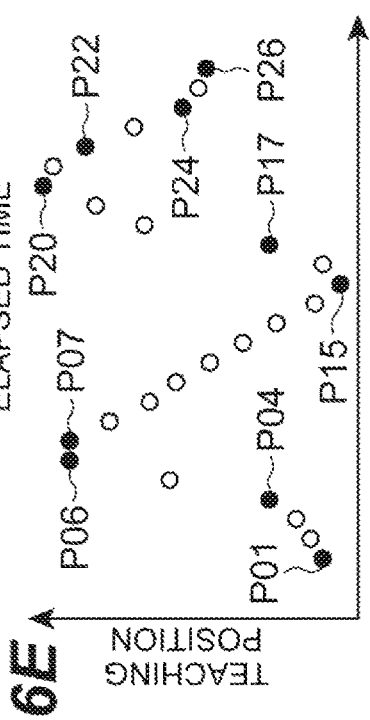
Figure 6F:
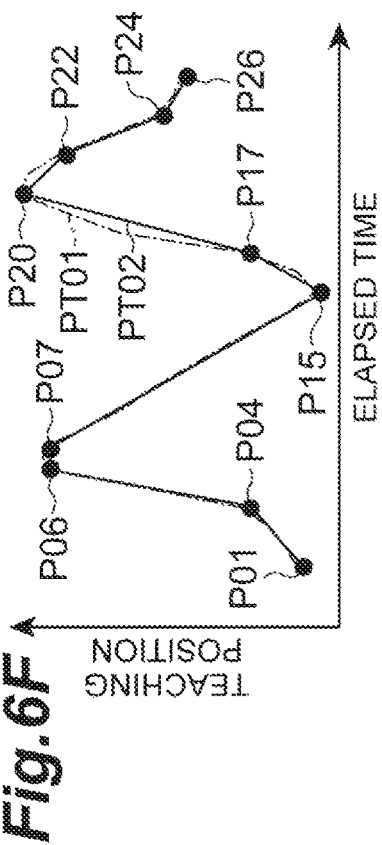
Figure 6A:
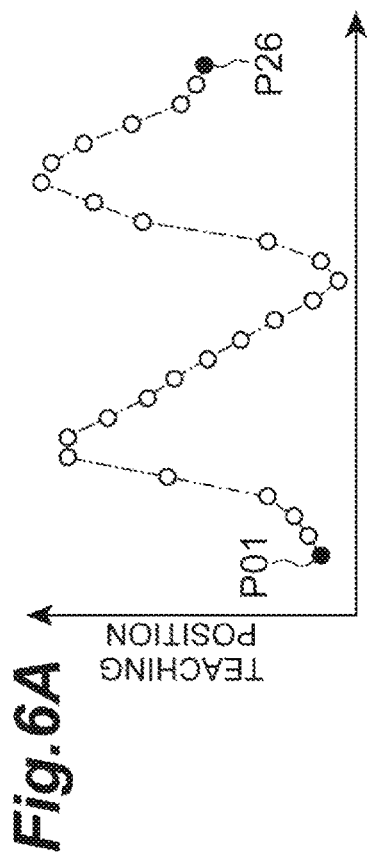
Figure 6B:
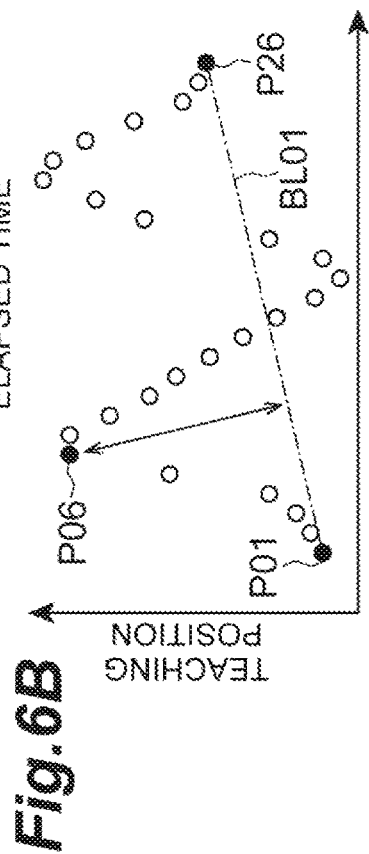
Figure 6C:
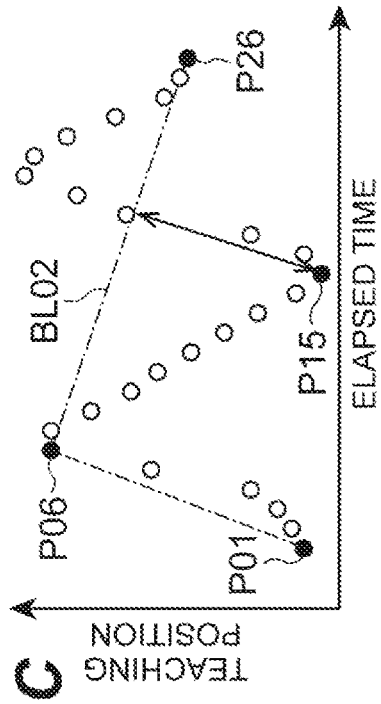

FIG. 5 is a graph illustrating teaching position data. FIGS. 6A to 6F are graphs illustrating the particulars of a thinning process. The horizontal axes of the graphs in FIG. 5 and FIGS. 6A to 6F indicate the elapsed time, and the vertical axes indicate the value of the teaching position. The teaching position data illustrated in FIG. 5 and FIGS. 6A to 6F includes 26 teaching positions P01 to P26. In FIGS. 6A to 6F, a white circle indicates a teaching position that has not been used, and a black circle indicates a teaching position that has been used.

In some examples, the position thinning unit 414 may add to the selected group a teaching position to which the amount of offset from the reference line is maximum as the other teaching position. First, in the time segment (for example, all time segments) of at least part of the teaching position data, the position thinning unit 414 uses the teaching positions P01 and P26 at both ends (see FIG. 6A). Next, the position thinning unit 414 derives a reference line BL01 connecting the teaching positions P01 and P26, and uses a teaching position P06 at which the amount of offset from the reference line BL01 is maximum (see FIG. 6B). Next, the position thinning unit 414 derives a reference line BL02 connecting the used teaching positions P01, P06, and P26, and uses the teaching position P15 at which the amount of offset from the reference line BL02 is maximum (see FIG. 6C). Next, the position thinning unit 414 derives a reference line BL03 connecting the used teaching positions P01, P06, P15, and P26, and uses the teaching position P20 at which the amount of offset from the reference line BL03 is maximum (see FIG. 6D). The position thinning unit 414 repeats the operation until the number of used teaching positions reaches the upper limit value (for example, 10). Thus, ten teaching positions P01, P04, P06, P07, P15, P17, P20, P22, P24, and P26 are used (see FIG. 6E). After that, the position thinning unit 414 removes teaching positions P02, P03, P05, P08, P09, P10, P11, P12, P13, P14, P16, P18, P19, P21, P23, and P25, which were not used (see FIG. 6F). Thus, the thinning process of the teaching position data is completed.

In the above procedure, the teaching position that has not been used until the number of teaching positions that has been used reaches the upper limit value has a relatively small amount of offset from the reference line, as compared with the used teaching position. The amount of offset from the reference line correlates with the magnitude of the influence on the movement of the robot. In some examples, according to the above-mentioned procedure, the teaching positions having a relatively small influence on the movement of the robot are removed. For this reason, the amount of offset between the movement trajectory PT01 connecting all teaching positions P01 to P26 and the movement trajectory PT02 connecting the teaching positions P01, P04, P06, P07, P15, P17, P20, P22, P24, and P26 after thinning is suppressed to a small value.

The above-mentioned repetition completion condition is not limited to the number of used teaching positions reaching the upper limit value. In other words, the position thinning unit 414 may repeat operations including deriving the reference line and adding another teaching point to the selected group based on the amount of offset from the reference line to the other teaching position until there is no teaching position to which the amount of offset from the reference line exceeds a predetermined threshold value. For example, the position thinning unit 414 may regard a condition in which there is no teaching position at which the amount of offset from the reference line exceeds a predetermined threshold value as the repetition completion condition. In this case, the number of used teaching positions may exceed the upper limit value. In a case where the number of used teaching positions exceeds the upper limit value, the number of used teaching positions may be adjusted by a method such as correcting the threshold value of the amount of offset.

Further, the method based on the amount of offset between the teaching position and the reference line connecting teaching positions prior to and posterior to the teaching position is not limited to the method illustrated in FIGS. 6A to 6F. FIGS. 7A to 7F are graphs illustrating a modification of the method based on the amount of offset between the teaching position and the reference line connecting teaching positions prior to and posterior to the teaching position. In the method of FIGS. 7A to 7F, whether to use each of the teaching positions P02 to P25 excluding the teaching positions P01 and P26 at both ends is determined based on the immediately preceding teaching position and the immediately subsequent teaching position.

Figure 7D:
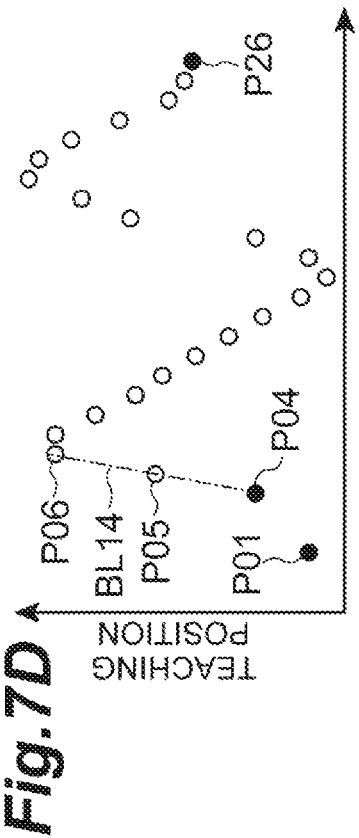
FIGS. 7A to 7F are graphs illustrating another example of the thinning process.
Figure 7E:
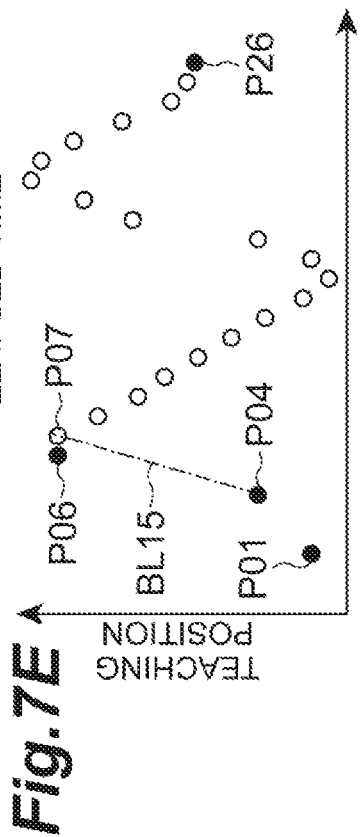
Figure 7F:
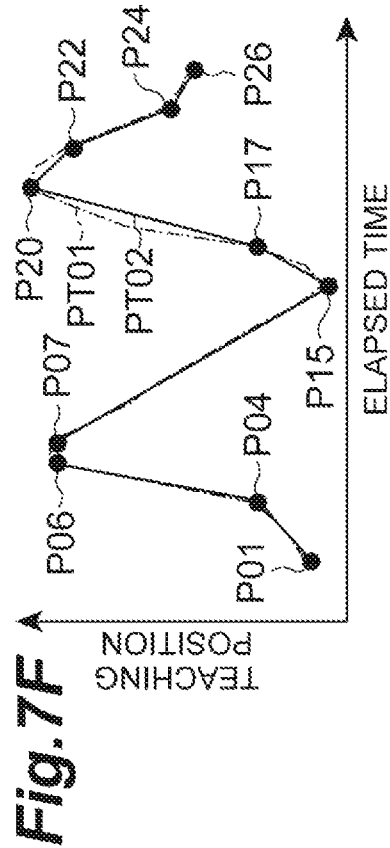
Figure 7A:
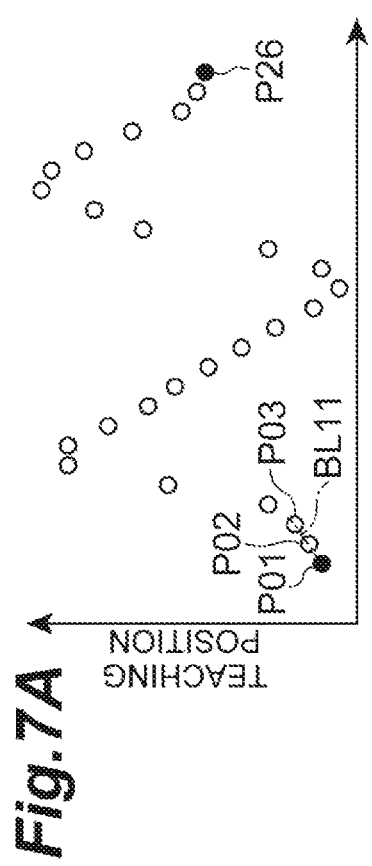
Figure 7B:
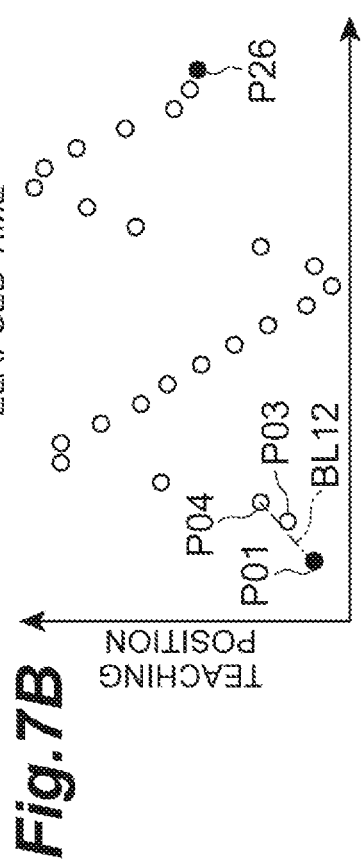
Figure 7C:
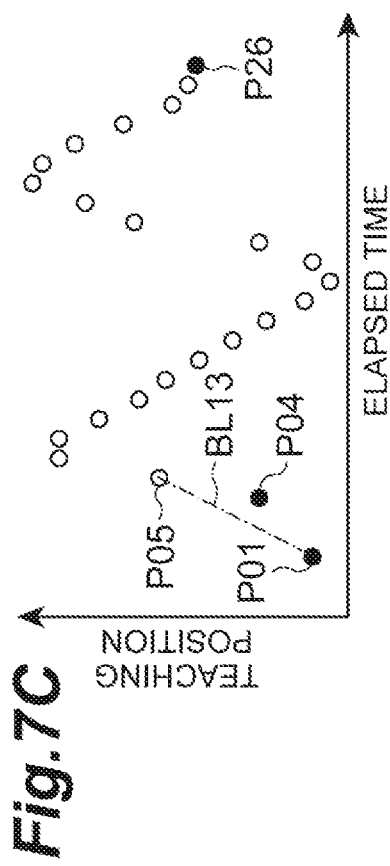

First, the position thinning unit 414 determines whether to use the teaching position P02 based on the amount of offset from a reference line BL11 connecting the teaching positions P01 and P03 (see FIG. 7A). When the amount of offset from the reference line BL11 is smaller than the threshold value, the teaching position P02 is removed. Next, the position thinning unit 414 determines whether to use a teaching position P03 based on the amount of offset from a reference line BL12 connecting the teaching positions P01 and P04 (see FIG. 7B). When the amount of offset from the reference line BL12 is smaller than the threshold value, the teaching position P03 is removed. Next, the position thinning unit 414 determines whether to use the teaching position P04 based on the amount of offset from the reference line BL13 connecting the teaching positions P01 and P05 (see FIG. 7C). When the amount of offset from the reference line BL13 is larger than the threshold value, the teaching position P04 is used. Next, the position thinning unit 414 determines whether to use a teaching position P05 based on the amount of offset from a reference line BL14 connecting the teaching positions P04 and P06 (see FIG. 7D). When the amount of offset from the reference line BL14 is smaller than the threshold value, the teaching position P05 is removed. Next, the position thinning unit 414 determines whether to use the teaching position P06 based on the amount of offset from a reference line BL15 connecting the teaching positions P04 and P07 (see FIG. 7E). When the amount of offset from the reference line BL15 is larger than the threshold value, the teaching position P06 is used. The position thinning unit 414 repeats the above-described process until the determination of whether or not to use the teaching position P25. Thus, ten teaching positions P01, P04, P06, P07, P15, P17, P20, P22, P24, and P26 are used (see FIG. 7F).

Also in the above procedure, the teaching position which has not been used has a relatively small amount of offset from the reference line, as compared with the teaching position which has been used. In some examples, also according to the above-mentioned procedure, the teaching positions having a relatively small influence on the movement of the robot are removed. For this reason, the amount of offset between the movement trajectory PT01 connecting all teaching positions P01 to P26 and the movement trajectory PT02 connecting the teaching positions P01, P04, P06, P07, P15, P17, P20, P22, P24, and P26 after thinning is suppressed to a small value.

Figure 4:
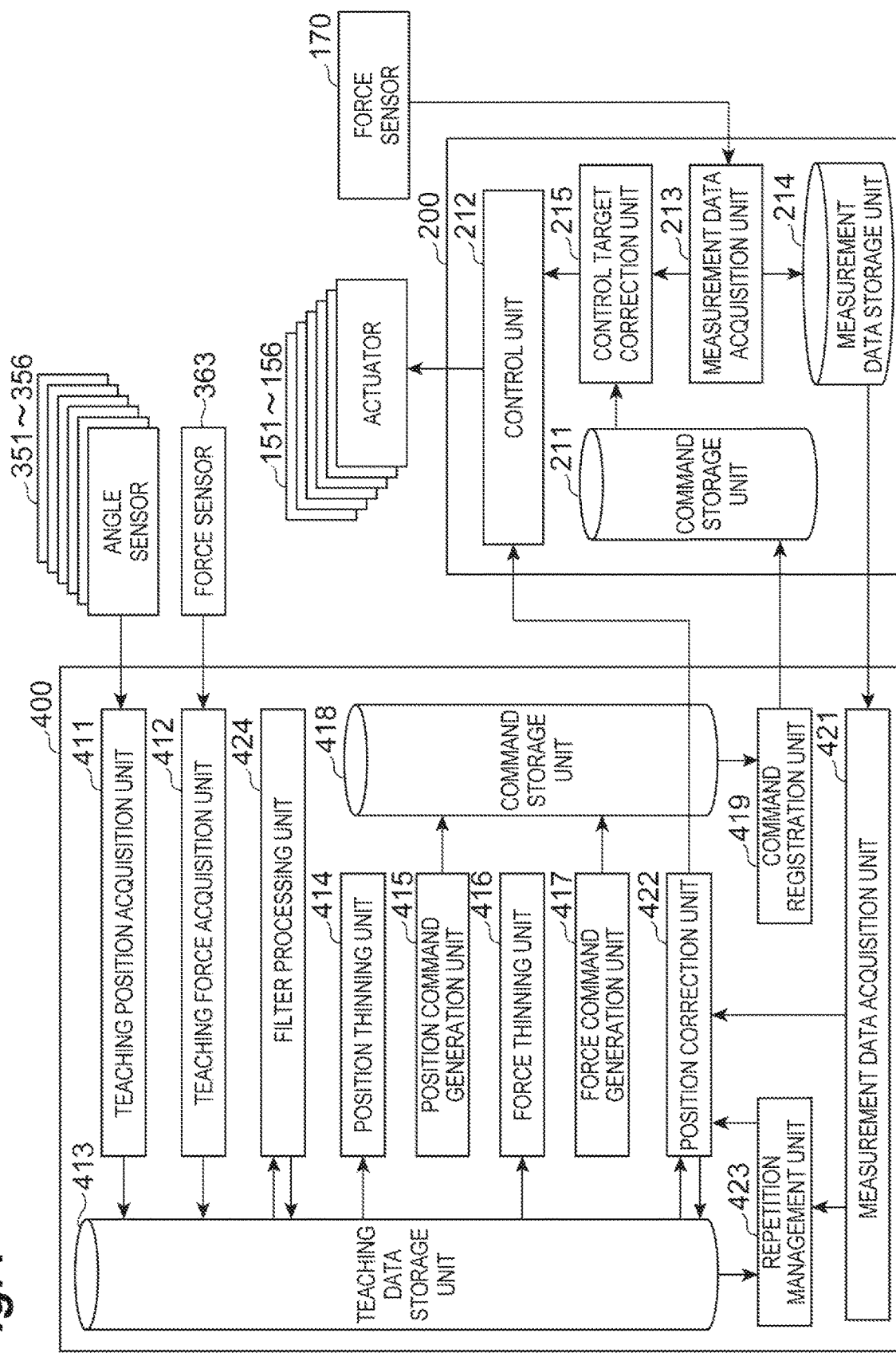
FIG. 4 is a block diagram illustrating an example functional configuration of a teaching computer and a robot controller.

Returning to FIG. 4, the position command generation unit 415 generates a position command based on the thinned position data. For example, the position command generation unit 415 calculates a plurality of target positions by performing an calculation including the coordinate conversion from the second coordinate system C2 to the first coordinate system C1 with respect to a plurality of teaching positions included in thinned position data to generate a plurality of movement commands corresponding to a plurality of target positions.

In addition, the position and posture (hereinafter referred to as "demonstration position") where the work object is disposed at the time of the demonstration operation, and the position and posture (hereinafter referred to as "regeneration position") at which the work object is disposed when the robot 100 corresponding to the demonstration operation operates may be different. Even in this case, when the relationship between the coordinate data of the demonstration position in the second coordinate system C2 and the coordinate data of the regeneration position in the first coordinate system C1 is known, a plurality of target positions may be calculated based on a plurality of teaching positions.

The force thinning unit 416 generates thinned position data obtained by removing at least one of the teaching forces from the teaching force data stored in the teaching data storage unit 413. For the teaching force thinning process by the force thinning unit 416, the same method as the teaching position thinning process by the position thinning unit 414 can be applied. In some examples, the force thinning unit 416 may generate the thinned force data based on an influence of at least one of the teaching forces on a force applied to a work object by the robot. For example, the force thinning unit 416 removes the teaching force having a small influence on the force applied to the work object by the robot 100 (hereinafter referred to as "work force") from the teaching force data to generate the thinned force data.

As an example of the thinning process based on the influence on work force, the force thinning unit 416 may generate thinned force data so that the teaching force remains when the difference between the work force of the robot 100 when a teaching force is present and the work force of the robot 100 when the teaching force is not present is large. As an example of a numerical value which shows the difference between the work force of the robot 100 when the teaching force is present and the work force of the robot 100 when the teaching force is not present, the force thinning unit 416 may calculate the amount of offset between a teaching force and the reference line connecting teaching forces prior to and posterior to the teaching force to determine whether to remove the teaching force based on the amount of offset.

For example, after using the teaching forces at both ends in the time segment of at least part of the teaching force data, the force thinning unit 416 repeats one or more operations including deriving a reference line connecting the used teaching forces, and determining whether to use another teaching force based on the amount of offset from the reference line until a predetermined condition is satisfied. Additionally, the force thinning unit 416 removes the teaching force that has not been used to generate the thinned force data. As an example of the above-mentioned predetermined condition (hereinafter referred to as "repetition completion condition"), the number of used teaching forces may reach the upper limit value. The upper limit value is set based on, for example, the number of force application commands that can be registered in the robot controller 200.

One teaching force may include a plurality of numerical elements (for example, force component for each coordinate axis). In this case, the force thinning unit 416 may calculate the amount of offset between the teaching force and the reference line by adding up the amount of offset for each numerical element.

The force command generation unit 417 generates a force command based on the thinned force data. For example, the force command generation unit 417 calculates a plurality of target work forces based on a plurality of teaching forces included in the thinned force data to generate a plurality of force application commands corresponding to a plurality of target positions. The command storage unit 418 stores the position command generated by the position command generation unit 415 and the force command generated by the force command generation unit 417. The command registration unit 419 registers the position command and the force command stored in the command storage unit 418 in the robot controller 200.

The teaching computer 400 may further include a measurement data acquisition unit 421, a position correction unit 422, and a repetition management unit 423. The measurement data acquisition unit 421 acquires measurement data of force applied to the work object by the robot 100 when the robot controller 200 operates the robot 100. For example, the measurement data acquisition unit 421 acquires the measurement data by the force sensor 170 from the robot controller 200.

The position correction unit 422 corrects the position command so that the measurement data acquired by the measurement data acquisition unit 421 comes close to the teaching force data. In other words, the position correction unit 422 may correct the position command so as to reduce a difference between the measurement data and the teaching force data. For example, the position correction unit 422 requests the robot controller 200 to operate the robot 100 based on the position command and the force command. In response to this, the robot controller 200 operates the robot 100, and the measurement data acquisition unit 421 acquires the measurement data during that time from the robot controller 200. The position correction unit 422 corrects the position command so that the measurement data comes close to the teaching force data.

For example, at a plurality of time points based on the time of the motion start of the robot 100, the position correction unit 422 calculates the deviation between the measurement data and teaching force data to correct the position command to reduce the deviation at each time point. For example, the position correction unit 422 calculates the correction amount of the position command by performing a proportional calculation, a proportional/integral calculation, a proportional/integral/differential calculation, or the like on the deviation between the measurement data and the teaching force data.

The position correction unit 422 may correct the position command based on the deviation between the measurement data and the thinned force data, instead of the deviation between the measurement data and the teaching force data. As mentioned above since the thinned force data is generated to suppress the amount of offset of the force transition before and after the thinning, the resulting measurement data comes close to the teaching force data even if the correction is based on the deviation between the measurement data and the thinned force data.

The position correction unit 422 may correct teaching position data so that the measurement data comes close to the teaching force data, as an example of correction of the position command. In this case, in order to correct the position command according to the correction of the teaching position data, the position thinning unit 414 removes at least one of the teaching positions from the teaching position data corrected by the position correction unit 422 and updates thinned position data.

The position command generation unit 415 updates the position command based on the thinned position data updated by the position thinning unit 414. Updating here involves replacing old data with new data. Also, replacement here involves overwriting old data with new data.

The position correction unit 422 may correct the thinned position data instead of the teaching position data. Additionally, the position at the time when the teaching position is not present may be corrected. Then, when correcting the position at the time when the teaching position is not present, the number of teaching positions included in the thinned position data may increase as a result. Therefore, when the position correction unit 422 corrects the thinned position data, the position thinning unit 414 may remove at least one of the teaching positions from the thinned position data after correction by the position correction unit 422 to update the thinned position data. The position command generation unit 415 may update the position command based on the thinned position data updated by the position thinning unit 414.

The repetition management unit 423 causes a control unit 212 (described in further detail later) of the robot controller 200 to repeat the motion of the robot 100, the measurement data acquisition unit 421 to repeat the acquisition of measurement data, and the position correction unit 422 to repeat the correction of the position command until the amount of offset between the measurement data and the teaching force data satisfies the allowable condition. As an example of an allowable condition, the sum of the absolute values of the deviations between the measurement data and the teaching force data at the plurality of time points is equal to or less than a predetermined allowable value, or the sum of the squares of the deviations between the measurement data and the teaching force data at a plurality of time points is equal to or less than a predetermined allowable value. The repetition management unit 423 causes the control unit 212 to repeat the motion of the robot 100, the measurement data acquisition unit 421 to repeat the acquisition of measurement data, and the position correction unit 422 to repeat the correction of the position command, so that the measurement data will converge within the range satisfying the allowable condition. For example, when the position correction unit 422 repeats the correction of teaching position data, the correction result by the position correction unit 422 is accumulated in the teaching position data stored in the teaching data storage unit 413, and the measurement data converges to a value that satisfies the allowable condition.

The teaching computer 400 may further include a filter processing unit 424. The filter processing unit 424 corrects the teaching position data so as to reduce the positional fluctuation of the robot 100 (for example, the positional fluctuation of the distal end 110) before applying a force to the work object. For example, the filter processing unit 424 applies low-pass filtering to the teaching position before applying a force to the work object to correct the teaching position data. An example of low-pass filtering includes finite impulse response filtering.

Figure 8A:
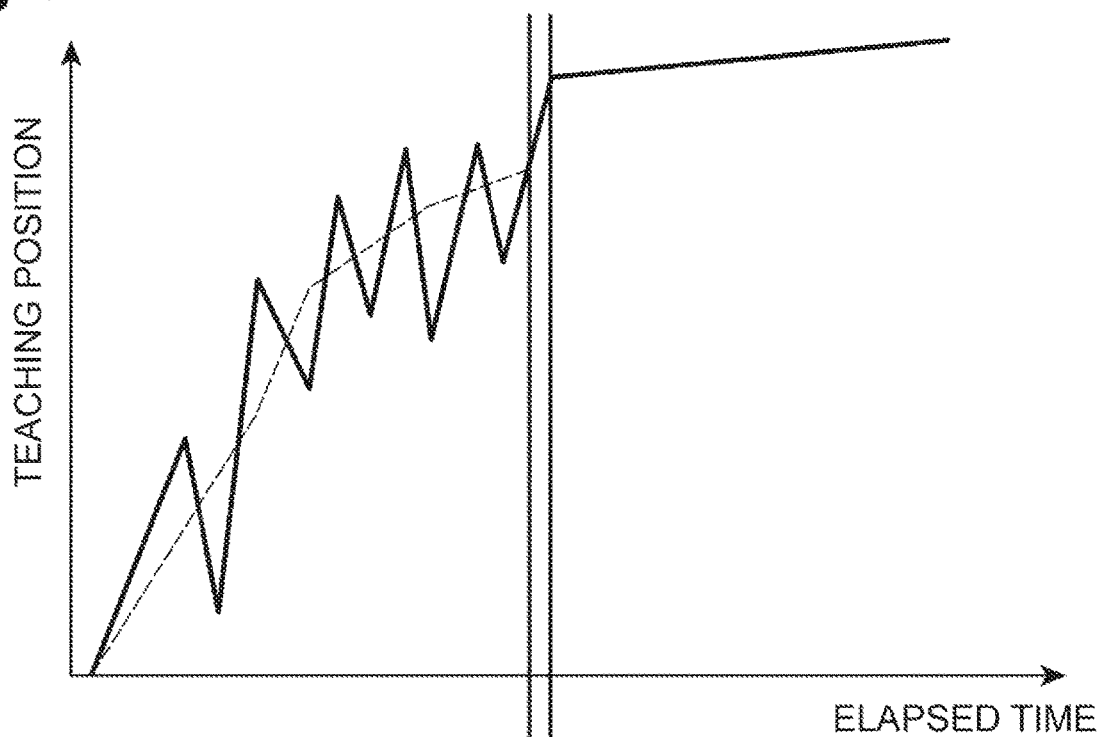
FIGS. 8A and 8B are graphs illustrating example particulars of a filter process.
Figure 8B:
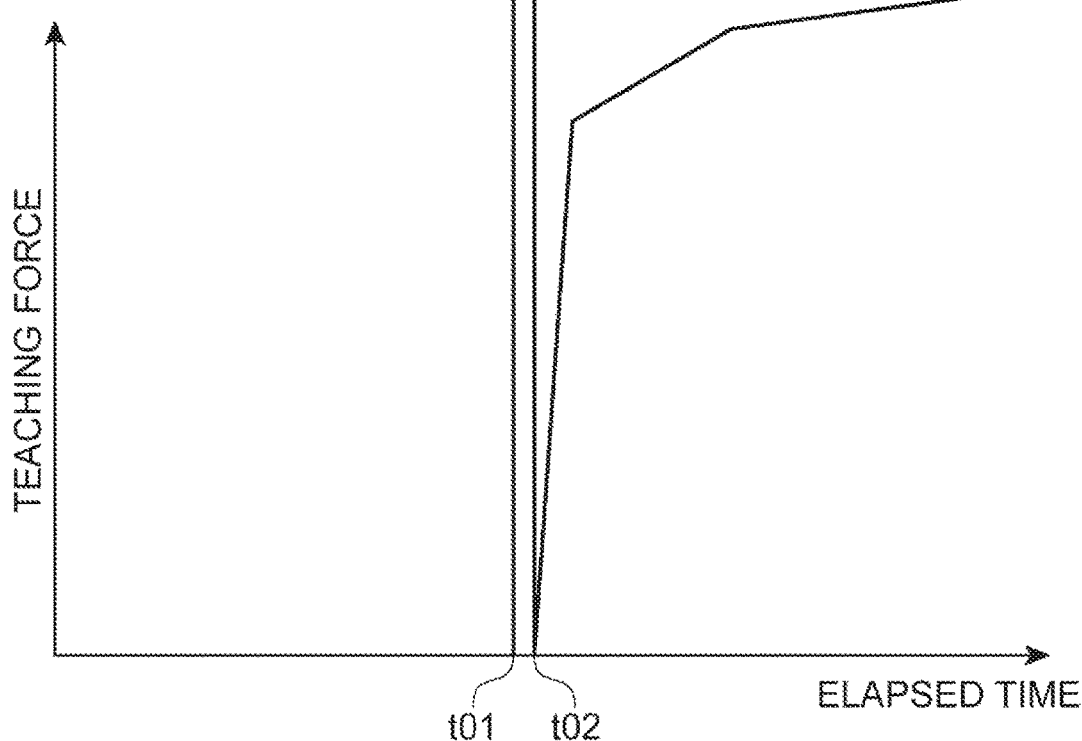

FIGS. 8A and 8B are graphs illustrating the particulars of the filter process. The horizontal axis in FIGS. 8A and 8B indicates the elapsed time. The vertical axis in FIG. 8A indicates the value of the teaching position. The vertical axis in FIG. 8B indicates the value of the teaching force. The solid line in FIG. 8A indicates teaching position data before a filter process, and the broken line in FIG. 8A indicates teaching position data after a filter process.

In FIGS. 8A and 8B, since the teaching force rises after time t02, the start of application of the force is assumed at time t02. The filter processing unit 424 sets, as a reference, time t01 which is before the time t02 by a predetermined time so as not to apply a filter process after applying a force, performs a filter process on the teaching position data before time t01, and does not perform a filter process on the teaching position data after time t01. Thereby, before time t01, the fluctuation of the teaching position due to the operator's hand movement or the like is reduced.

Robot Controller

The robot controller 200 includes, as a functional module, a command storage unit 211, the control unit 212, a measurement data acquisition unit 213, and a measurement data storage unit 214.

The command storage unit 211 stores the position command and the force command registered by the command registration unit 419 of the teaching computer 400. The control unit 212 operates the robot 100 based on at least the position command stored in the command storage unit 211. For example, based on the position command, the control unit 212 repeats at a predetermined control cycle calculating a target position of the distal end 110, calculating a target angle of the joints 141, 142, 143, 144, 145, and 146 corresponding to the target position of the distal end 110, and outputting driving power for causing the angles of the joints 141, 142, 143, 144, 145, and 146 to follow the target angle to the actuators 151, 152, 153, 154, 155, and 156.

The measurement data acquisition unit 213 acquires, from the force sensor 170, the measurement data of the force applied to the work object by the robot 100 when the control unit 212 operates the robot 100. For example, the measurement data acquisition unit 213 acquires measurement data from the force sensor 170 at each control cycle.

The measurement data storage unit 214 stores, in time series, the measurement data acquired by the measurement data acquisition unit 213 while the robot 100 is operating. The measurement data acquisition unit 421, for example, acquires measurement data from the measurement data storage unit 214.

The robot controller 200 may further include a control target correction unit 215. The control target correction unit 215 corrects the control target position of the robot 100 by the control unit 212 during the motion of the robot 100 so as to makes the force applied to the work object by the robot 100 come close to the force command.

For example, the control target correction unit 215 calculates the amount of correction of the position and posture of the distal end 110 (hereinafter referred to as "target position correction amount") for each control cycle so as to reduce the deviation between the measurement data by the force sensor 170 and the force command, and adds the target position correction amount to the target position of the subsequent control cycle. For example, the control target correction unit 215 calculates the target position correction amount in the direction of weakening the force when the measurement data by the force sensor 170 is larger than the force command, and calculates the target position correction amount in the direction of strengthening the force when the measurement data by the force sensor 170 is smaller than the force command. In some examples, the control target correction unit 215 calculates a target position correction amount by performing a proportional calculation, a proportional/integral calculation, a proportional/integral/differential calculation, or the like on the deviation between the measurement data by the force sensor 170 and the force command. By following the control target correction unit 215, the control unit 212 operates the robot 100 based on both the position command and the force command stored in the command storage unit 211.

Hardware Configuration of Teaching Computer and Robot Controller

As illustrated in FIG. 9, the teaching computer 400 includes a main body 481, a display device 482 and an input device 483. The display device 482 and the input device 483 function as a user interface of the teaching computer 400. The display device 482 is, for example, a liquid crystal monitor, and is used to display information to the user. The input device 483 is, for example, a foot switch or a keyboard, and acquires information input by the user. The display device 482 and the input device 483 may be integrated as a so-called touch panel.

The main body 481 includes a circuit 490. The circuit 490 includes at least one processor 491, a memory 492, a storage 493, an input/output port 494, and a communication port 495. The storage 493 is a computer readable non-volatile storage medium (for example, flash memory).

The storage 493 stores a program for causing the teaching computer to execute a motion teaching method including acquiring reference information including position and posture information detected by the teaching motion detection unit 32 in a state where the tool index units provided in the demonstration tool 31 are disposed at a plurality of positions in the first coordinate system C1. Additionally, the motion teaching method may include deriving coordinate relation information indicating a relation between the first coordinate system C1 and the second coordinate system C2 based on the reference information, acquiring demonstration motion information including information indicating transition of position and posture detected by the teaching motion detection unit 32 during the demonstration operation using the demonstration tool 31, and generating a motion command of the distal end 110 based on the demonstration motion information and the coordinate relation information. For example, the storage 493 includes a storage area for constituting the above-described functional module, and a storage area allocated to the teaching data storage unit 413 and the command storage unit 418.

The memory 492 temporarily stores the program loaded from the storage 493, the calculation result by the processor 491, and the like. The processor 491 executes the program in cooperation with the memory 492, and constitutes each functional module of the teaching computer 400. The input/output port 494 acquires signals from the angle sensors 351, 352, 353, 354, 355, and 356, the force sensor 363, and the input device 483 in accordance with a command from the processor 491, and outputs the signals to the display device 482. The communication port 495 performs network communication with the robot controller 200 in response to a command from a processor 291.

The robot controller 200 includes a circuit 290. The circuit 290 includes the at least one processor 291, a memory 292, a storage 293, an input/output port 294, a driver 295, and a communication port 296. The storage 293 is a computer readable non-volatile storage medium (for example, flash memory). The storage 293 includes a storage area for configuring the above-described functional module, and a storage area allocated to the command storage unit 211 and the measurement data storage unit 214.

The memory 292 temporarily stores the program loaded from the storage 293, the calculation result by the processor 291, and the like. The processor 291 executes the program in cooperation with the memory 292, and constitutes each functional module of the robot controller 200. The input/output port 294 acquires a signal from the force sensor 170 in response to a command from the processor 291. The driver 295 outputs driving power to the actuators 151, 152, 153, 154, 155, and 156 in accordance with a command from the processor 291. The communication port 296 performs network communication with the teaching computer 400 in response to a command from the processor 291.

Motion Teaching Procedure

Subsequently, a motion teaching procedure executed by the robot system 1 will be illustrated as an example of the motion teaching method. This procedure includes, based on the operator's demonstration data, acquiring teaching position data, generating thinned position data obtained by removing at least one of the teaching positions from the teaching position data, generating a position command based on thinned position data, and operating a work robot based on a position command. This procedure may further include, based on the operator's demonstration data, acquiring teaching force data, generating thinned force data obtained by removing at least one of the teaching forces from the teaching force data, and generating a force command based on thinned force data, and may operate the work robot based on the position command and the force command.

Figure 10:
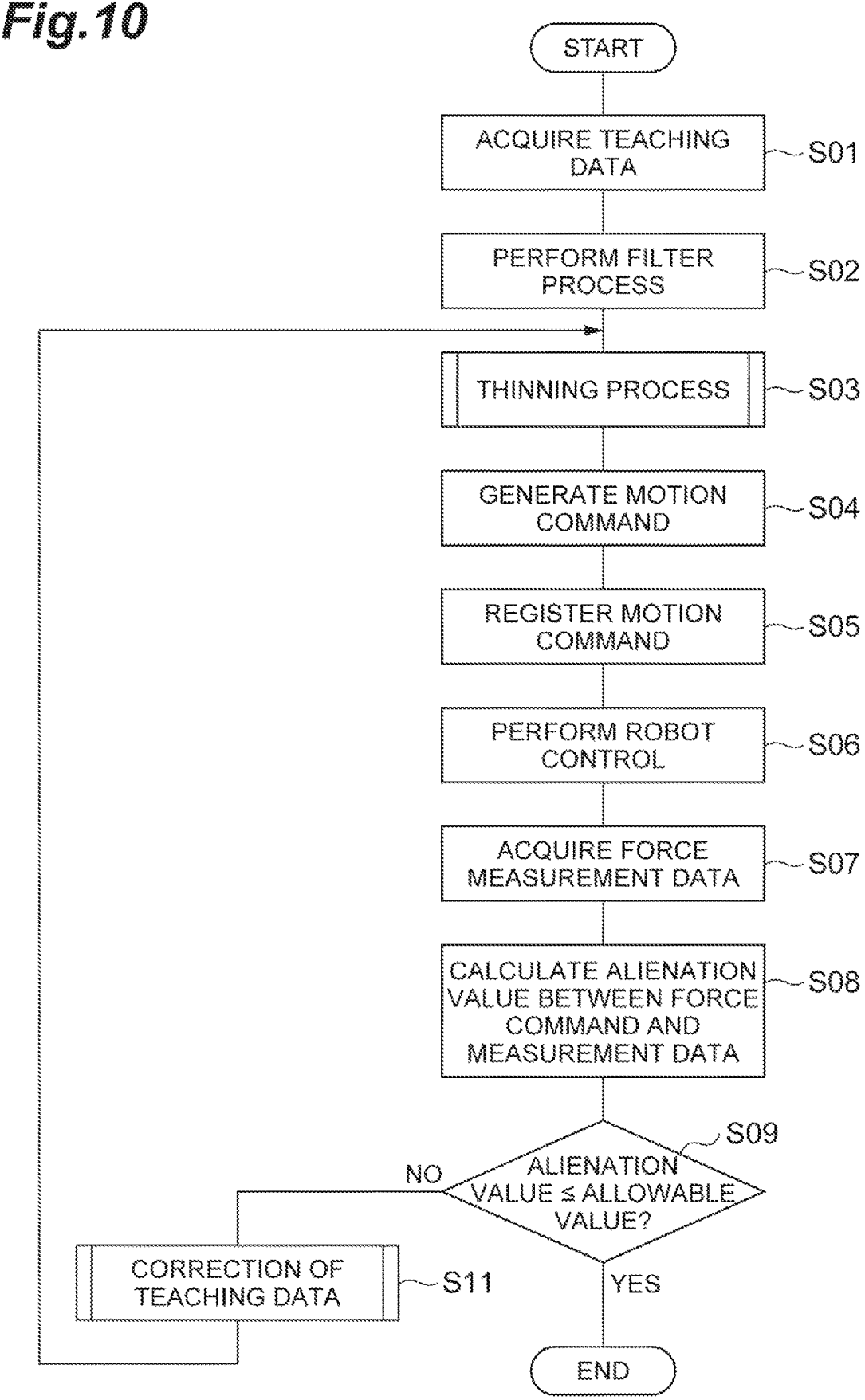
FIG. 10 is a flowchart illustrating an example motion teaching procedure.

As illustrated in FIG. 10, the teaching computer 400 first executes operations S01 and S02. In operation S01, the teaching position acquisition unit 411 acquires teaching position data including a plurality of teaching positions arranged in time series based on the demonstration data of the operator. In operation S01, the teaching force acquisition unit 412 acquires teaching force data including a plurality of teaching forces arranged in time series based on the demonstration data of the operator. In operation S02, the filter processing unit 424 corrects the teaching position data so as to reduce the positional fluctuation of the robot 100 (for example, the positional fluctuation of the distal end 110) before applying a force to the work object.

Next, the teaching computer 400 executes operation S03. In operation S03, the position thinning unit 414 generates thinned position data obtained by removing at least one of the teaching positions from the teaching position data stored in the teaching data storage unit 413, and stores the data in the command storage unit 418. In operation S03, the force thinning unit 416 generates thinned position data obtained by removing at least one of the teaching forces from the teaching force data stored in the teaching data storage unit 413, and stores the data in the command storage unit 418. The example processing procedure of operation S03 will be described in additional detail later.

Next, the teaching computer 400 executes operations S04 and S05. In operation S04, the position command generation unit 415 generates a position command based on the thinned position data, and stores the position command in the command storage unit 418. In operation S04, force command generation unit 417 generates a force command based on the thinned force data and stores the force command in the command storage unit 418. In operation S05, the command registration unit 419 registers the position command and force command stored in the command storage unit 418 in the robot controller 200.

Next, the teaching computer 400 executes operation S06. In operation S06, the position correction unit 422 requests the control unit 212 of the robot controller 200 to perform motion control in accordance with the position command. The control unit 212 operates the actuators 151 to 156 based on the position command stored in the command storage unit 211. At this time, the control target correction unit 215 may correct the control target position of the robot 100. For example, the control target correction unit 215 calculates the target position correction amount for each control cycle so as to reduce the deviation between the measurement data by the force sensor 170 and the force command stored in the command storage unit 211, and adds the target position correction amount to the target position of the subsequent control cycle. In some examples, the control unit 212 may operate the actuators 151 to 156 based on both the position command and the force command.

Next, the teaching computer 400 executes operations S07, S08, and S09. In operation S07, the measurement data acquisition unit 421 acquires measurement data by the force sensor 170 from the robot controller 200. In operation S08, the repetition management unit 423 calculates an amount of offset between the measurement data acquired by the measurement data acquisition unit 421 and the teaching force data. Examples of the amount of offset include, for example, the sum of absolute values of deviations between measurement data and teaching force data at a plurality of time points, and the sum of squares of the deviations. In operation S09, the repetition management unit 423 checks whether the amount of offset calculated in operation S08 is equal to or less than the allowable value.

When the amount of offset exceeds the allowable value in operation S09, the teaching computer 400 executes operation S11. In operation S11, the position correction unit 422 corrects the teaching position data. The example processing procedure of operation S11 will be described in additional detail later. After the end of operation S11, the teaching computer 400 returns the process to operation S03. After that the thinning process of teaching position data by the position thinning unit 414, the motion of the robot 100 by the control unit 212, and the correction of the teaching position data by the position correction unit 422 are repeated until the amount of offset is less than the allowable value.

When the amount of offset is equal to or less than the allowable value in operation S09, the repetition management unit 423 completes the repetition of the process from operation S03 to operation S11. The motion teaching procedure is completed.

Figure 11:
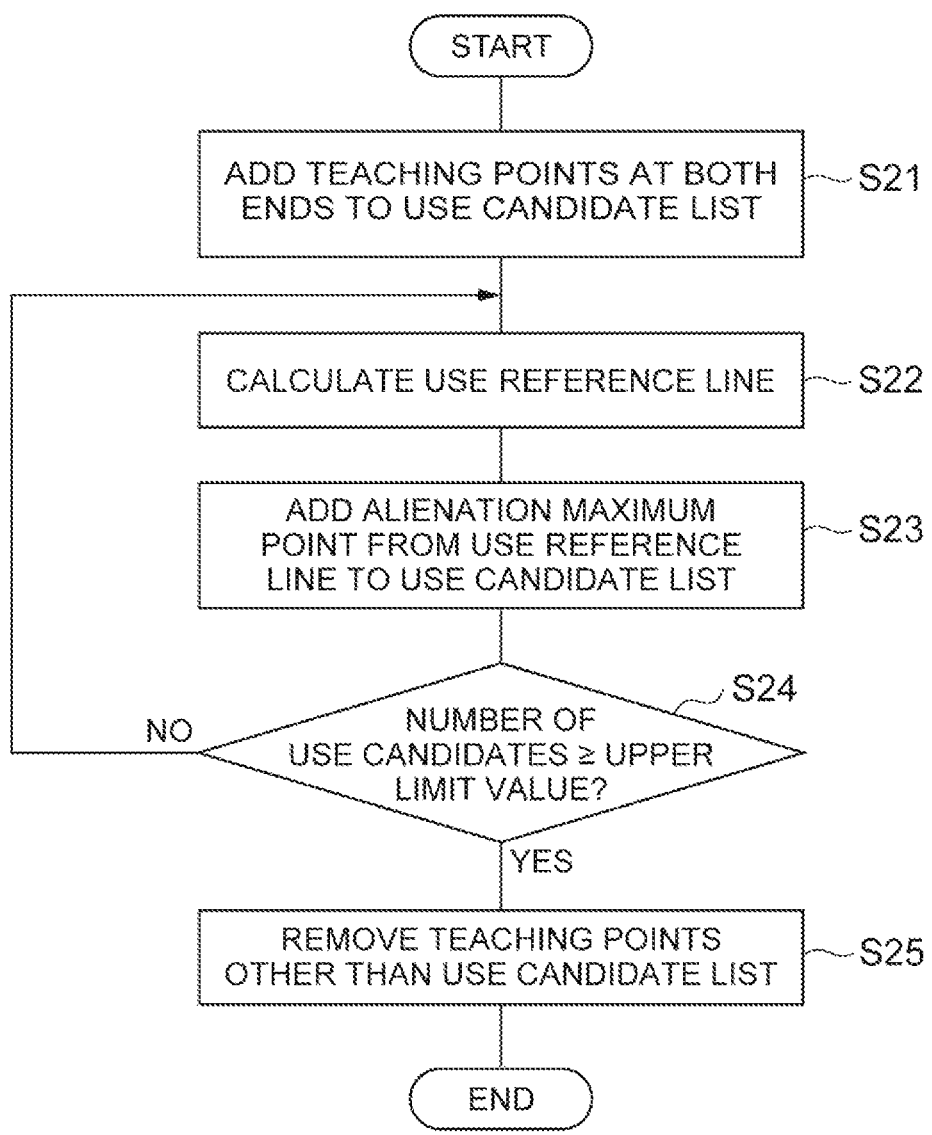
FIG. 11 is a flowchart illustrating an example thinning process procedure.

FIG. 11 is a flowchart illustrating the thinning process procedure in operation S03. In FIG. 11, the thinning process by the position thinning unit 414 and the thinning process by the force thinning unit 416 are common. Therefore, in FIG. 11, an element corresponding to the teaching position or teaching force is described as a "teaching point".

As illustrated in FIG. 11, the teaching computer 400 first executes operations S21, S22, S23, and S24. In operation S21, the position thinning unit 414 or the force thinning unit 416 adds the teaching points at both ends of at least part of the time segment to a use candidate list. In operation S22, the position thinning unit 414 or the force thinning unit 416 derives a reference line connecting the teaching points added to the use candidate list. In operation S23, the position thinning unit 414 or the force thinning unit 416 adds the teaching point having the largest amount of offset from the reference line to the use candidate list. In operation S24, the position thinning unit 414 or the force thinning unit 416 checks whether the number of teaching points added to the use candidate list has reached the upper limit value.

When the number of teaching points added to the use candidate list in operation S24 has not reached the upper limit value, the teaching computer 400 returns the process to operation S22. After that, deriving the reference line, and adding the teaching point with the largest amount of offset from the reference line to the use candidate list are repeated until the number of teaching points added to the use candidate list reaches the upper limit value.

When the number of teaching points added to the use candidate list in operation S24 has reached the upper limit value, the teaching computer 400 executes operation S25. In operation S25, the position thinning unit 414 or the force thinning unit 416 removes teaching points that are not in the use candidate list. The thinning process procedure is completed.

Figure 12:
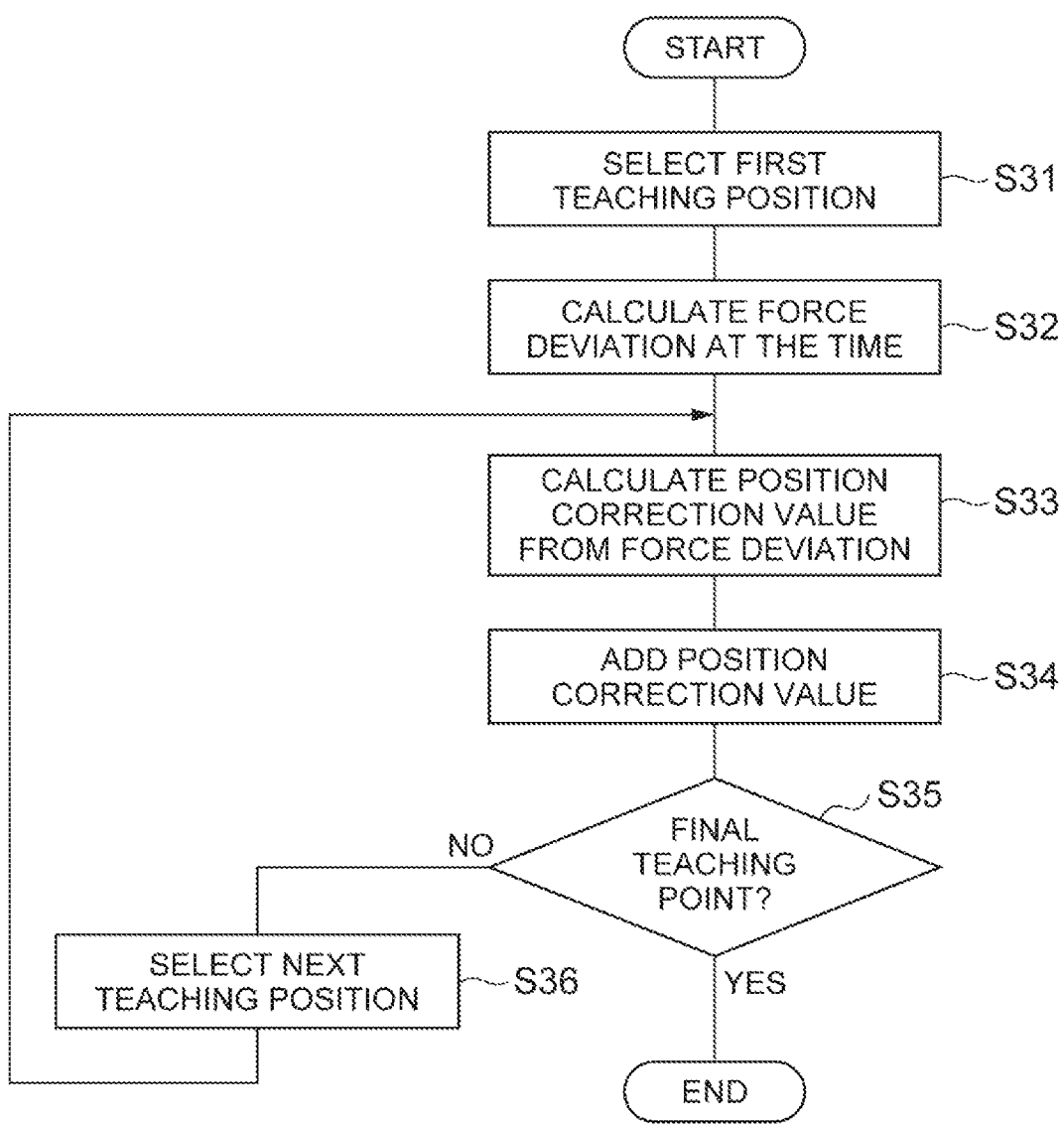
FIG. 12 is a flowchart illustrating an example procedure for correcting teaching position data.

FIG. 12 is a flowchart illustrating the procedure of correcting the teaching position data in operation S11. As illustrated in FIG. 12, the teaching computer 400 executes operations S31, S32, S33, S34, and S35. In operation S31, the position correction unit 422 selects the first teaching position of the entire time segment. In operation S32, the position correction unit 422 calculates the deviation between the measurement data and the teaching force data at the time corresponding to the teaching position being selected. In operation S33, the position correction unit 422 calculates a position correction value based on the force deviation calculated in operation S32. In operation S34, the position correction unit 422 adds the position correction value calculated in operation S33 to the teaching position being selected. In operation S35, it is determined whether the teaching position being selected is the final teaching position.

In operation S35, when the teaching position being selected is not the final teaching position, the teaching computer 400 executes operation S36. In operation S36, the position correction unit 422 selects the next teaching position. Thereafter, the teaching computer 400 returns the process to operation S32. Thereafter, the selection and correction of the teaching position are repeated until the final correction of the teaching position is completed.

In operation S35, when the teaching position being selected is the final teaching position, the teaching computer 400 ends the process. The correction procedure of teaching position data is completed.

As explained above, the robot system 1 includes the teaching position acquisition unit 411, the position thinning unit 414, the position command generation unit 415, and the control unit 212. The teaching position acquisition unit 411 may be configured to acquire teaching position data including a plurality of teaching positions arranged in time series based on the demonstration data of the operator. The position thinning unit 414 may be configured to generate thinned position data obtained by removing at least one of the teaching positions from the teaching position data. The position command generation unit 415 may be configured to generate a position command based on the thinned position data. Additionally, the control unit 212 may be configured to operate the work robot 100 based on the position command.

In some example operations performed by the robot system 1, a position command that regenerates the demonstration data with data points, the number of which is limited, is automatically generated by a process of removing the teaching position from the teaching position data based on the demonstration data in order to facilitate the motion teaching to the robot 100. In addition, the reduction in the number of data points of the position command improves the operability of the manual adjustment of the position command. Furthermore, extraneous movement of the robot 100 may be suppressed by reducing the number of data points of the position command, which may contribute to speeding-up and high efficiency of the motion.

The position thinning unit 414 may remove the teaching position having a small influence on the movement of the robot 100 from the teaching position data to generate the thinned position data. In some examples, the teaching position having a small influence on the movement of the robot 100 may be removed, to facilitate the generation of a position command that regenerates the demonstration data.

The robot system 1 may further include the teaching force acquisition unit 412 configured to acquire teaching force data including a plurality of teaching forces arranged in time series based on the demonstration data of the operator, the force thinning unit 416 configured to generate thinned force data obtained by removing at least one of the teaching forces from the teaching force data, the force command generation unit 417 configured to generate a force command based on the thinned force data. The control unit 212 may operate the robot 100 based on the position command and the force command. In some examples, a force command that regenerates the demonstration data with data points, the number of which is limited, is further automatically generated by a process of generating a force command based on demonstration data, and removing a force target value with a small contribution to the temporal variation of the force in order to facilitate the motion teaching to the robot 100.

The force thinning unit 416 may remove the teaching force having a small influence on the force applied to the workpiece W by the robot 100 from the teaching force data to generate the thinned force data. In some examples, the teaching force having a small influence on the force generated by the robot 100 may be removed, to facilitate the generation of a force command that regenerates the demonstration data.

The robot system 1 may further include the measurement data acquisition unit 421 configured to acquire measurement data of the force that the robot 100 applies to the workpiece W when the control unit 212 operates the robot 100, and the position correction unit 422 configured to correct the position command so that the measurement data comes close to the teaching force data. In some examples, the position command is automatically adjusted so as to simultaneously follow the position command and the force command in order to facilitate the motion teaching to the robot 100.

The position correction unit 422 corrects the teaching position data so that the measurement data comes close to the teaching force data, the position thinning unit 414 removes at least one of the teaching positions from the teaching position data corrected by the position correction unit 422 to update the thinned position data, and the position command generation unit 415 may update the position command based on the thinned position data updated by the position thinning unit 414. In some examples, the position command is automatically adjusted while an increase in the number of data points is suppressed. Furthermore, finer position correction may be performed by correcting the teaching position data before thinning to facilitate the motion teaching to the robot 100.

The robot system 1 may further include the repetition management unit 423 configured to cause the control unit 212 to repeat the motion of the robot 100, the measurement data acquisition unit 421 to repeat the acquisition of measurement data, and the position correction unit to repeat the correction of the position command until the amount of offset between the measurement data and the teaching force data satisfies the allowable condition. In some examples, the position command is automatically adjusted by the repetition process. Therefore, it is effective in facilitating the motion teaching to the robot 100.

When the difference between the motion of the robot 100 when the teaching position is present and the motion of the robot 100 when the teaching position is not present is large, the position thinning unit 414 may generate thinned position data so that the teaching position remains.

The position thinning unit 414 may determine whether to remove the teaching position based on the magnitude of the amount of offset between a teaching position and the reference line connecting teaching positions prior to and posterior to the teaching position. In some examples, the position target value having a small influence on the movement of the robot 100 may be easily removed.

After using the teaching positions at both ends in the time segment of at least part of the teaching position data, the position thinning unit 414 may repeat one or more operations including deriving a reference line connecting the used teaching positions, and determining whether to use another teaching position based on the amount of offset from the reference line until a predetermined condition is satisfied, and may remove the teaching position that has not been used to generate the thinned position data. In some examples, the position target value having a small influence on the movement of the robot 100 may be more easily removed.

The robot system 1 may further include the filter processing unit 424 configured to correct the teaching position data so as to reduce the positional fluctuation of the robot 100 before applying a force to the workpiece W, and the position thinning unit 414 may remove at least one of the teaching positions from the teaching position data corrected by the filter processing unit 424 to generate the thinned position data. In some examples, since it is easy to remove the position target value in the motion which does not affect the operation result, the data points, the number of which is limited, can be used more effectively to regenerate the demonstration data.

The robot system 1 may further include the control target correction unit 215 configured to correct the control target position of the robot 100 by the control unit 212 during the motion of the robot 100 so that the force applied by the robot 100 to the workpiece W comes close to the force command. In some examples, the transition of the force in the demonstration may be regenerated more appropriately with a limited number of data points.

It is to be understood that not all aspects, advantages and features described herein may necessarily be achieved by, or included in, any one particular example embodiment. Indeed, having described and illustrated various examples herein, it should be apparent that other examples may be modified in arrangement and detail.

We claim all modifications and variations coming within the spirit and scope of the subject matter claimed herein.

What is claimed is:
1. A robot system comprising circuitry configured to:
   acquire teaching position data including a plurality of teaching positions arranged in time series based on demonstration data of an operator;
   generate thinned position data obtained by removing at least one of the teaching positions from the teaching position data;
   generate a position command based on the thinned position data;
   acquire teaching force data including a plurality of teaching forces arranged in time series based on the demonstration data of the operator;
   generate thinned force data obtained by removing at least one of the teaching forces from the teaching force data;

generate a force command based on the thinned force data; and operate a work robot based on the position command and the force command.

2. The robot system according to claim 1, wherein the teaching positions include two teaching positions having different influence on a movement of the robot, and the circuitry is further configured to remove, from the teaching position data, one of the two teaching positions having a smaller influence on the movement of the robot.

3. The robot system according to claim 2, wherein the influence of the teaching position includes a change in a motion of the robot in accordance with the teaching position data by removing the teaching position from the teaching position data.

4. The robot system according to claim 3, wherein the circuitry is further configured to generate the thinned position data based on an amount of offset between a teaching position and a reference line connecting teaching positions prior to and posterior to the teaching position.

5. The robot system according to claim 1, wherein the teaching forces include two teaching forces having different influence on a working force applied to a work object by the robot, and the circuitry is further configured to remove, from the teaching force data, one of the two teaching forces having a smaller influence on the working force applied to the work object by the robot.

6. The robot system according to claim 1, wherein the circuitry is further configured to:

acquire measurement data of a working force applied to a work object by the robot operated based on the position command and the force command; and correct the position command so as to reduce a difference between the measurement data and the teaching force data.

7. The robot system according to claim 6, wherein the circuitry is further configured to:

correct the teaching position data so as to reduce the difference between the measurement data and the teaching force data;

remove at least one of the teaching positions from the corrected teaching position data to update the thinned position data; and update the position command based on the updated thinned position data.

8. The robot system according to claim 6, wherein the circuitry is further configured to repeat a sequence of operations comprising:

an operation of the robot based on the position command and the force command;

an acquisition of the measurement data of the working force applied to the work object by the robot, and a correction of the position command until an amount of offset between the measurement data and the teaching force data satisfies an allowable condition.

9. The robot system according to claim 1, wherein the circuitry is further configured to:

correct the teaching position data so as to reduce a positional fluctuation of the robot before applying a working force to a work object; and remove at least one of the teaching positions from the corrected teaching position data to generate the thinned position data.

10. The robot system according to claim 1, wherein the circuitry is further configured to correct a control target position of the robot during an operation of the robot so as to reduce a difference between a force applied to a work object by the robot and the force command.

11. The robot system according to claim 1 further comprising:

a demonstration tool for performing motion teaching by demonstration; and a teaching motion detection unit configured to detect position of the demonstration tool, wherein the circuitry is further configured to acquire the teaching position data based on the position of the demonstration tool detected by the teaching motion detection unit.

12. The robot system according to claim 11, wherein the teaching motion detection unit comprises:

a passive articulated arm configured to move according to the position of the demonstration tool, the articulated arm having a plurality of joints; and a plurality of angle sensors configured to detect motion angles of the joints respectively, and wherein the circuitry is configured to acquire information on the motion angles of the joints from the angle sensors so as to calculate the teaching position based on the motion angles.

13. The robot system according to claim 12, wherein the teaching motion detection unit further comprises a force sensor configured to detect a force acting on the demonstration tool, and wherein the circuitry is further configured to acquire teaching force data based on the force detected by the force sensor.

14. A robot control method comprising:

acquiring teaching position data including a plurality of teaching positions arranged in time series based on demonstration data of an operator;

generating thinned position data obtained by removing at least one of the teaching positions from the teaching position data;

generating a position command based on the thinned position data;

acquiring teaching force data including a plurality of teaching forces arranged in time series based on the demonstration data of the operator;

generating thinned force data obtained by removing at least one of the teaching forces from the teaching force data;

generating a force command based on the thinned force data; and operating a work robot based on the position command and the force command.

15. A non-transitory memory device having instructions stored thereon that, in response to execution by a processing device, cause the processing device to perform operations comprising:

acquiring teaching position data including a plurality of teaching positions arranged in time series based on demonstration data of an operator;

generating thinned position data obtained by removing at least one of the teaching positions from the teaching position data;

generating a position command based on the thinned position data;

acquiring teaching force data including a plurality of teaching forces arranged in time series based on the demonstration data of the operator;

generating thinned force data obtained by removing at least one of the teaching forces from the teaching force data;

generating a force command based on the thinned force data; and operating a work robot based on the position command and the force command.

16. A robot system comprising circuitry configured to:

acquire teaching position data including a plurality of teaching positions arranged in time series based on demonstration data of an operator;

generate thinned position data obtained by removing at least one of the teaching positions from the teaching position data, wherein the thinned position data is generated based on an amount of offset between a teaching position and a reference line connecting teaching positions prior to and posterior to the teaching position;

generate a position command based on the thinned position data; and operate a work robot based on the position command.

17. The robot system according to claim 16, wherein the circuitry is further configured to:

add teaching positions of both ends in a time segment of at least part of the teaching position data to a selected group;

repeat operations including deriving a reference line connecting the teaching positions added to the selected group, and adding another teaching position of the time segment to the selected group based on the amount of offset between the reference line and the other teaching position until a predetermined condition is satisfied, and remove one or more teaching positions that have not been added to the selected group to generate the thinned position data.

18. The robot system according to claim 17, wherein the circuitry is further configured to:

repeat operations including deriving the reference line and adding another teaching point to the selected group based on the amount of offset from the reference line to the other teaching position until a number of the teaching positions added to the selected group reaches a predetermined upper limit value; and remove one or more teaching positions that have not been added to the selected group to generate the thinned position data.

19. The robot system according to claim 17, wherein the circuitry is further configured to add to the selected group a teaching position to which the amount of offset from the reference line is maximum as the other teaching position.

20. The robot system according to claim 17, wherein the circuitry is further configured to:

repeat operations including deriving the reference line and adding another teaching point to the selected group based on the amount of offset from the reference line to the other teaching position until there is no teaching position to which the amount of offset from the reference line exceeds a predetermined threshold value; and remove one or more teaching positions that have not been added to the selected group to generate the thinned position data.

21. A robot control method comprising:

acquiring teaching position data including a plurality of teaching positions arranged in time series based on demonstration data of an operator;

generating thinned position data obtained by removing at least one of the teaching positions from the teaching position data, wherein the thinned position data is generated based on an amount of offset between a teaching position and a reference line connecting teaching positions prior to and posterior to the teaching position;

generating a position command based on the thinned position data; and operating a work robot based on the position command.

22. The robot control method according to claim 21, wherein the amount of offset represents a change in a motion of the robot in accordance with the teaching position data by removing the teaching position, and wherein the thinned position data is obtained by comparing the amount of offset at two or more teaching positions of the teaching position data and removing the teaching position that represents a smaller change in the motion of the robot.

23. A non-transitory memory device having instructions stored thereon that, in response to execution by a processing device, cause the processing device to perform operations comprising:

acquiring teaching position data including a plurality of teaching positions arranged in time series based on demonstration data of an operator;

generating thinned position data obtained by removing at least one of the teaching positions from the teaching position data, wherein the thinned position data is generated based on an amount of offset between a teaching position and a reference line connecting teaching positions prior to and posterior to the teaching position;

generating a position command based on the thinned position data; and operating a work robot based on the position command.

24. The non-transitory memory device according to claim 23, wherein the amount of offset represents a change in a motion of the robot in accordance with the teaching position data by removing the teaching position, and wherein the thinned position data is obtained by comparing the amount of offset at two or more teaching positions of the teaching position data and removing the teaching position that represents a smaller change in the motion of the robot.

* * * * *